United States Patent
Olkin et al.

(10) Patent No.: US 7,277,549 B2
(45) Date of Patent: Oct. 2, 2007

(54) SYSTEM FOR IMPLEMENTING BUSINESS PROCESSES USING KEY SERVER EVENTS

(75) Inventors: Terry M. Olkin, Los Gatos, CA (US); Jahanshah Moreh, Los Angeles, CA (US)

(73) Assignee: Secure Data In Motion, Inc., San Mateo, CA (US)

( * ) Notice: Subject to any disclaimer, the term of this patent is extended or adjusted under 35 U.S.C. 154(b) by 717 days.

(21) Appl. No.: 10/707,190

(22) Filed: Nov. 25, 2003

(65) Prior Publication Data

US 2004/0148500 A1     Jul. 29, 2004

Related U.S. Application Data

(63) Continuation-in-part of application No. 10/305,726, filed on Nov. 26, 2002, which is a continuation-in-part of application No. 09/558,691, filed on Apr. 25, 2000, now Pat. No. 6,584,564.

(51) Int. Cl.
*H04L 9/00* (2006.01)

(52) U.S. Cl. ............... 380/277; 380/278; 380/279; 380/283; 707/1; 707/9

(58) Field of Classification Search ............ 713/150, 713/155, 167–168, 182; 726/2; 707/1, 9–10; 380/277–279, 283; 709/223–224; 455/410–411; 360/1

See application file for complete search history.

(56) References Cited

U.S. PATENT DOCUMENTS

| | | | |
|---|---|---|---|
| 4,897,875 A | 1/1990 | Pollard et al. | 380/21 |
| 5,200,999 A | 4/1993 | Matyas et al. | |
| 5,475,757 A * | 12/1995 | Kelly | 713/159 |
| 5,495,533 A * | 2/1996 | Linehan et al. | 713/155 |
| 5,602,918 A * | 2/1997 | Chen et al. | 713/153 |
| 5,615,268 A * | 3/1997 | Bisbee et al. | 713/176 |
| 5,748,735 A | 5/1998 | Ganesan | 380/21 |
| 5,841,865 A | 11/1998 | Sudia | 380/21 |

(Continued)

OTHER PUBLICATIONS

Australian Patent Office, Written Opinion, App. No. SG 200503239-6, Date of mailing Dec. 22, 2005 [a report prepared for and communicated to the Singapore Registry of Patents and ultimately received by Applicant on Mar. 8, 2006].

(Continued)

*Primary Examiner*—T. B. Truong
(74) *Attorney, Agent, or Firm*—Raymond E. Roberts; Intellectual Property Law Offices

(57) ABSTRACT

A key server (320) based communication system (310) wherewith communicating parties, originators (312) and recipients (314), exchange encrypted communications (324). An originator requests or provides a key (330) to the key server, optionally with an assertion (322) from an authentication authority (318). Based on attributes (326) from the originator or elsewhere, the key server sets controlling events (340) for the communication. The originator encrypts and sends the communication to one or more recipients. A recipient may or may not request the key to decrypt the message. Positive events (342) are determined based on the controlling events and when and how many such requests occur. Negative events (344) are determined based on the absence of any requests or all requests being untimely.

30 Claims, 13 Drawing Sheets

U.S. PATENT DOCUMENTS

| | | |
|---|---|---|
| 5,848,161 A | 12/1998 | Luneau et al. ................. 380/49 |
| 5,864,667 A | 1/1999 | Barkan |
| 6,009,173 A | 12/1999 | Sumner |
| 6,023,700 A | 2/2000 | Owens et al. .................. 707/10 |
| 6,055,314 A | 4/2000 | Spies et al. .................... 380/21 |
| 6,230,156 B1 | 5/2001 | Hussey ........................ 707/10 |
| 6,289,105 B1 | 9/2001 | Murota ....................... 380/286 |
| 6,442,686 B1 | 8/2002 | McArdle et al. ............ 713/151 |
| 2003/0147536 A1 | 8/2003 | Andivahis et al. .......... 380/277 |

OTHER PUBLICATIONS

Australian Patent Office, Written Opinion (second), App. No. SG 200503239-6, Date of mailing Jan. 19, 2007 [a report prepared for and communicated to the Singapore Registry of Patents and ultimately received by Applicant on Feb. 27, 2007].

* cited by examiner

FIG. 6a: Basic user information table (Users)

| Column Name | Type | Description |
| --- | --- | --- |
| UserId | integer | Internal user identifier |
| Password | raw | Hash of user's password |
| Salt | integer | Salt added to password before hash |
| Status | varchar | User's current registration/usage status |

FIG. 6b: Sent messages table (SentMail)

| Column Name | Type | Description |
| --- | --- | --- |
| MessageId | integer | Unique email identifier |
| SenderId | integer | Internal sender identifier (ref to Users) |
| DateSent | date | Time and date record entered |
| NumRecipients | integer | Number of users message was sent to |
| MessageKey | raw | Key used to encrypt/decrypt message |
| MaxDeliveries | integer | Maximum times key is delivered to each user |
| Expiration | date | Time after which message should not be delivered |
| SealSalt | integer | Secret salt added to hash to form seal |
| Subject | varchar | The subject of the message |
| LastRead | date | The date the message was last read |
| DeliverAfter | date | The date after which the message may be read |

FIG. 6c: Email destinations (Receivers)

| Column Name | Type | Description |
| --- | --- | --- |
| MessageId | integer | Email message's identifier (ref to SentMail) |
| ReceiverAddr | integer | Receiver's e-mail address |
| FirstRequest | date | Time the receiver first attempts to read |
| NumRequests | integer | Number of times receiver requested to read |

FIG. 6d: Alternate user identities (UserAliases)

| Column Name | Type | Description |
| --- | --- | --- |
| EmailAddress | varchar | Alternate email address |
| UserId | integer | Reference to Users table. |

FIG. 6e: Distribution list master (Distributions)

| Column Name | Type | Description |
| --- | --- | --- |
| DistributionId | integer | Unique list identifier |
| OwnerId | integer | User who owns list (ref to Users). |
| ListName | varchar | Email address of this list |

FIG. 6f: Distribution list members (ListMembers)

| Column Name | Type | Description |
| --- | --- | --- |
| DistributionId | integer | Reference to Distributions |
| MemberAddress | varchar | Name of alias on the list |
| Administrate | char | Y=member can update list, N=cannot |

SYSTEM FOR IMPLEMENTING BUSINESS PROCESSES USING KEY SERVER EVENTS

CROSS REFERENCE TO RELATED APPLICATIONS

This is a continuation-in-part of application Ser. No. 10/305,726, filed Nov. 26, 2002 and which is a continuation-in-part of application Ser. No. 09/558,691, filed Apr. 25, 2000 and now issued as U.S. Pat. No. 6,584,564 on Jun. 24, 2003.

BACKGROUND OF INVENTION

1. Technical Field

The present invention relates generally to providing security for messages communicated in networks, including the Internet, and specifically to determining events related to the receipt of messages.

2. Background Art

Virtually every user of electronic communications mediums has at some time or another paused to wonder about the security of communications within those systems. Various reasons exist for concern in this regard, probably ones far too numerous to cover here, but a few examples include having to depend on complex technologies, having to rely on unknown and possibly untrustworthy intermediaries, and the increasing anonymity in our electronic networks due to the distances which communications may travel and the masses of people which we may now reach.

Existing communications systems have had a long time to establish security mechanisms and to build up trust in them by their users. In the United States our conventional postal mail is a good example. We deposit our posted letters into a receptacle which is often very physically secure. Our letters are then picked up, sorted, transported, and ultimately delivered to a similar receptacle for retrieval by their recipients. Between the receptacles of a sender and a receiver the persons handling a letter are part of a single organization (at least intra-nationally) that is well known to us and considered to be highly trustworthy. Even on the rare occasions when the security of our postal system does fail, it has mechanisms to quickly detect and to correct this.

Unfortunately, most of us do not have anywhere near a similar degree of trust in the security of electronic communications as they pass between senders and receivers in our modern networks. We generally trust only in our ability to maintain the security of our sending and receiving "receptacles" for messages, such as e-mail, instant messages, video-conferences, collaborative documents, etc. This is because these receptacles are personal computers (PCs), workstations, Internet appliances, etc. that are within our personal physical control. We also typically appreciate that we have much less control over what goes on in the electronic medium between such receptacles. For instance, potentially any number of miscreants might receive and copy an unsecured message without its sender and intended receivers being any the wiser. Even worse, in many cases, electronic communications can be lost in transit, maliciously altered, fraudulently concocted entirely, or later simply repudiated.

The problem of e-message security is severe and is already receiving considerable attention. Legal mechanisms have already been put into place, and stronger ones continue to be put into place, at least for e-mail messages, to punish and to discourage security breaches. However, the very beneficial ability of electronic messages to travel so far and so swiftly as they can also means that they may cross legal boundaries, potentially hampering such legal efforts and definitely creating a crisis in user confidence.

Old technologies have been revived and extended for use in the new electronic medium, and often these are variations of ones long used in combination with conventional postal systems to obtain heightened security there. Thus we are seeing a resurgence of interest in and the use of cryptography.

Many of the existing systems for securing electronic communications are unwieldy, not well trusted, or both. The very electronic systems which have made modern electronic communications possible and efficient have already made many conventional cryptographic systems obsolete, or at least highly suspect. Equally or more modern computer systems have the ability to perform staggering numbers of tedious operations in a massively parallel manner, and many strong cryptographic systems of the past have now been shown to be no longer reliable.

New systems for securing electronic communications have emerged, however. The last 25 years have seen the introduction, rapid development, and more recently the application of public-key and private-key based systems commonly termed a "public key infrastructure" (PKI). These are presently quite popular, but perhaps prematurely and unduly.

The foundation of the PKI system is generally attributed to work done by Ron Rivest, Adi Shamir, and Leonard Adleman at the Massachusetts Institute of Technology in the mid 1970's. The result of that work, commonly known as the RSA algorithm, is a cryptosystem wherein both a public and a private key are assigned to a principal. The public key is revealed to all, but the private key is kept secret. The keys used are both large prime numbers, often hundreds of digits long, and the inherent strength of the RSA algorithm lies in the difficulty in mathematically factoring large numbers.

To send a message securely the message is encrypted using the public key of its intended recipient (here the principal). The message can then only be decrypted and read by the recipient by using their private key. In this simple scenario anyone can send messages to the recipient which only the recipient can read.

A highly beneficial feature of the PKI approach is that a sender can also be a principal and can send a message which only they could have sent. i.e., a non-repudiable message. For this the sender encrypts a message (often only a part of what will be a larger message) using their private key. A recipient then knows that the purported or disputed sender is the true sender of the message, since only using that sender's public key will work to decrypt the message.

In practice, the sender and the receiver often are both principals in PKI systems. The sender encrypts a "signature" using their private key, then embeds this signature into their message, and then encrypts the result using the recipient's public key. The message then is secure from all but the recipient. Only the recipient can decrypt the message generally, using their private key, and once that is done the recipient may further use the sender's public key to specifically decrypt the signature. In this manner the receiver may rest assured that the sender is the true, nonrepudiable, source of the signature (and implicitly the entire message; but this works more securely still if the signature uniquely includes something like a hash of the general message).

As the presence of the term "infrastructure" in PKI implies, however, this popular cryptographic system requires a considerable support system. The public keys must be published so that those wishing to send a message can determine the keys for the intended message recipients. Additionally, public keys are certified for a specific period of time (e.g., one year) and must be renewed. Finally, if the private key is compromised or suspected as having been compromised, the corresponding public key must be revoked. Consequently, any communicating party must check the revocation status of a public key before using it to encrypt messages or verify signatures. These tasks are usually handled by a "certification authority." Unfortunately, as the marketplace in our competitive society is now demonstrating, this can lead to a plurality of certification authorities all vying for acceptance and thoroughly confusing the potential users. Moreover, the lifecycle of public keys (creation, distribution, renewal, and revocation) can lead to complex and unmanageable deployment scenarios.

Of course public and private key systems are possible without the use of a certification authority, say, among small groups wishing to carry out secure communications among themselves and where repudiation is not a concern. But as the very negative reaction by our government to initial publication of and about the RSA algorithm aptly demonstrated, true, unbridled security can be perceived as a threat to a government's ability to protect society. While it is probably now too late for most governments to fully suppress the use of ultra-strong cryptography, it also follows that such governments will be more receptive to cryptosystems that can be opened when truly appropriate (often termed "key escrow" systems).

PKI also has some other problems with regard to usability and efficiency. Since the keys are quite large, usually well beyond the capability of an average human to memorize, they are awkward to work with. Machine based storage and usage mechanisms usually must be employed just to handle the keys. This is a severe impediment to mobile use across multiple systems and to recovery after erasure from volatile memory, and it creates a whole host of additional problems related to protecting what effectively becomes a physical key needed to contain the private key. A receiver based key system, such as PKI, is also unwieldy in some situations. For example, if there are multiple intended recipients, a public key for each must be obtained and used to separately encrypt each message copy. This can encompass quite a severe computational burden as a list of intended message recipients grows in number. Accordingly, the common case in actual practice is that the message is first encrypted with a single symmetric key. The message key is then encrypted multiple times using each recipient's public key. Thus, the message itself is only encrypted once. It is the message key that is encrypted multiple times.

Accordingly, prior art cryptosystems and PKI systems, and the electronic message systems that employ these, provide many benefits. Unfortunately, even these have been found wanting. As it increasingly became apparent that it was desirable to improve on, augment, or even replace such systems the present inventors developed a "Secure E-Mail System" and a "Security Server System". These are respectively covered in U.S. Pat. No. 6,584,564 and U.S. application Ser. No. 10/305,726, hereby incorporated by reference in their entirety.

The approaches discussed above have considerably improved digital message communications, but they have still left room for further improvement. For example, many businesses use digital communication to conduct business with their customers, suppliers, partners, and other business associates. Digital communication (e.g., electronic mail, enterprise instant messaging (EIM), etc.), like non-digital communication (e.g., paper mail) is seldom a stand-alone process. Often, digital communication is a step in the overall business process flow and is triggered by a business event. For example, when a financial brokerage company determines that a customer's margin call is due it must send the customer a notice. The brokerage company may follow up with a phone call. The ability of the business to determine if the customers have opened their notices impacts the process of calling the customers to follow up. In this example, if the business can prove that the customer has opened the notice, then it need not call the customer to follow up. This can result in a reduced number of customer follow up calls, which in turn translates into savings for the business.

For illustration purposes we will use electronic e-mail to provide background. E-mail is good for this because it always involves a transaction (the e-mail), a transaction originator (the sender of the e-mail), and transaction targets (one or more recipients of the e-mail). It also assumes a decoupled environment, where the sender and recipients do not directly communicate with each other. The reading of an e-mail constitutes an event, and not reading an e-mail within a specified period of time also constitutes an event. Knowledge of such events can be particularly useful, both in business and other contexts.

Existing systems for digital message communications, such as the example described above in a business processes context, have a number of limitations. For instance, they are not transparent. The existing technology they use, such as a Public Key Infrastructure (PKI), requires user participation in acknowledging receipt of the communicated data. They do not support both action and the lack of action. In the existing technology such systems usage only provides knowledge about receipt of the communicated data. These systems fail to provide any information about the lack of receipt. Existing systems are also not decoupled. The existing technology they use, such as web-based communication, requires the sender of communication data to directly connect with the recipient. The existing systems also require voluntary participation by the recipients. A return-receipt e-mail, for example, requires voluntary participation by the recipient. If the recipient chooses not to acknowledge receipt of the communication, the originator cannot discern the difference between this event and the recipient not receiving the communication at all. The limitations make existing systems unduly recipient controlled, or not controlled at all, rather than originator-controlled. Existing technology, such as PKI-based e-mail, also does not permit an originator to control when a recipient can view the data. Once a message is transmitted, the recipients can view the data as soon as they receive it. Existing systems are often also constrained by the size of the communication data. Existing technologies, such as web-based communication, are dependent on the size of the communication data. The larger the data, the more memory and processing power is required for the underlying system. This unpredictability results in difficulties in managing the expected capacity of the communication systems.

Accordingly, prior art cryptosystems and PKI systems have also proven to be wanting when it comes to determining events related to digital communications, including but not necessarily limited to business communications.

SUMMARY OF INVENTION

Accordingly, it is an object of the present invention to provide security for messages communicated in networks such as the Internet.

Briefly one preferred embodiment of the present invention is a system for determining communications events. A key server is provided to release keys to communicating parties, wherein the keys are encryption keys to encrypt or decryption keys to decrypt the communications and the communicating parties include originators seeking to create and recipients seeking to view the communications. For each of the communications, the key server also assign an identifier, stores a record in a database that includes the identifier, a respective decryption key, and respective controlling events. For each of the communications, the key server also receives zero, one, or more requests for the decryption key, wherein these requests include the identifier. And for each of the communications, the key server also determines at least one member of the set consisting of positive events and negative events based on the controlling events and how many requests are received or when any requests are received.

Briefly another preferred embodiment of the present invention is a method for determining communication events. A first request for a resource ID to identify the communication is received, wherein this first request includes at least one identity of an intended recipient of the communication. At least one controlling event is defined, wherein the controlling events include the at least one identity. The resource ID is provided in reply to the first request. The resource ID, the controlling events, and a decryption key to decrypt the communication are stored. A second request for the decryption key is monitored for, wherein this second request includes the resource ID and identifying information for a putative intended recipient. If a second request is received, then it is determined whether it conforms with the controlling events. If so, the decryption key is provided in reply to the second request and the identifying information and a positive event are stored in association with the resource ID. If a second request is received that does not conform, a negative event is stored in association with the resource ID. Alternately, if no second request is received for an intended recipient, a negative event is stored in association with the resource ID.

An advantage of the present invention is that it is event based, supporting both action and inaction events (i.e., positive and negative events). Other than opening and view communications in largely the manner already used, voluntary action by recipients is not required.

Another advantage of the invention is that it enhances control, and this control is originator-end based, being set by actual originators or authorities over originators of communications. In particular, this control can set when first viewing, when last viewing, and how many times a communication can be viewed again.

Another advantage of the invention is that it permits decoupled communication. The technology used by the invention does not require the originator of a communication to be directly connect with the recipient. As noted above, an originator can send a communication now that a recipient is not allowed to view until later. When a recipient triggers a viewing related event (by viewing or failing in some manner to view the communication), this is logged or affirmatively reported to the originator or another appropriate party so that they can take appropriate action.

Another advantage of the invention is that it is largely transparent to users. The technology used by the invention does not require users to setup and employ, such as Public Key Infrastructure (PKI) with all of its attendant burdens (but this is still usable if desired), and it does not require user participation in acknowledging receipt of communications.

And, another advantage of the invention is that it is able to handle large data without heavily burdening the memory and processing power of the underlying hardware, yet providing security equaling or exceeding that of prior art approaches.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended drawings and table in which:

TABLE 1 shows the schema for the content of a database maintained by a key server.

FIGS. 2a-c depict e-mail forms which may be used by the embodiment in FIG. 1, wherein FIG. 2a is a conventional send form, FIG. 2b is a send form which is modified to work with the embodiment in FIG. 1, and FIG. 2c is a conventional receive form;

FIGS. 6a-e are the tables in FIG. 5 with descriptions for the fields used therein, wherein FIG. 6a is of user data, FIG. 6b is of message data, FIG. 6c is of destination data, FIG. 6d is of alias data for users, FIG. 6e is of optional distribution list data, and FIG. 6f is of member data for such distribution lists;

DETAILED DESCRIPTION

BEST MODE FOR CARRYING OUT THE INVENTION

Figure 1:
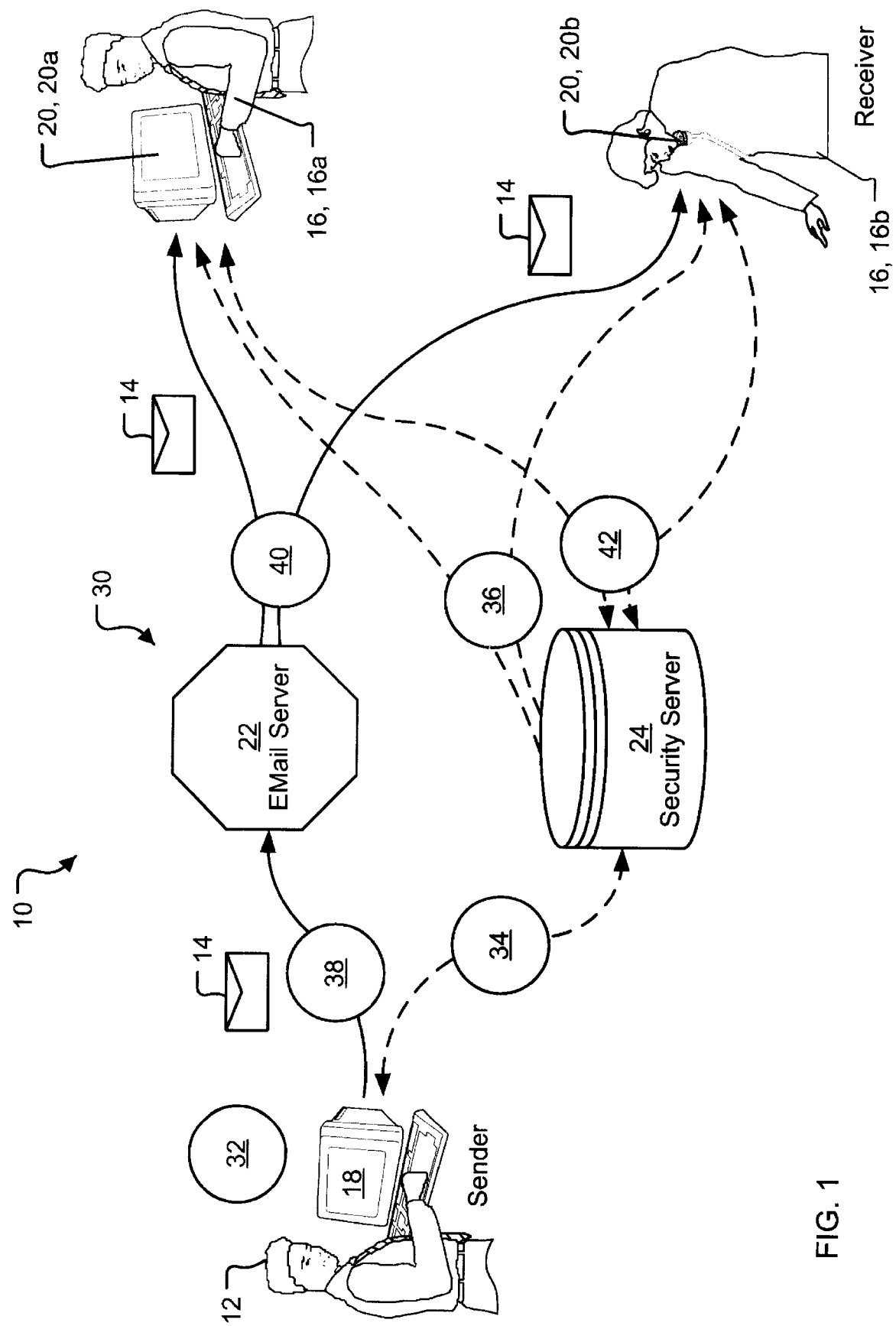
FIG. 1 is a schematic overview diagram generally depicting information flow in the context of an example secure e-mail system.

Unknown; A preferred embodiment of the present invention is a system for implementing business processes using key server events. As illustrated in the various drawings herein, and particularly in the view of FIG. 11, preferred embodiments of the invention are depicted by the general reference character 310.

Before discussing the present inventive communication system 310, we first discuss the background of key servers for secure messaging. This is essentially the content of application Ser. No. 10/305,726 and Pat. No. 6,584,564 by the present inventors.

FIG. 1 is a schematic overview diagram generally depicting information flow in a secure e-mail system 10. A sender 12 uses the secure e-mail system 10 to send a secure e-mail 14 to one or more receivers 16. To accomplish this the sender 12 employs a suitable sending unit 18 to create and send the secure e-mail 14, and the receivers 16 then employ suitable receiving units 20 to receive and view the secure e-mail 14. The secure e-mail system 10 further includes an e-mail server 22, which is essentially conventional, and a security server 24 (a form of key server, as discussed presently), that along with software modules 26 (FIG. 3) in the sending units 18 and the receiving units 20 constitute the primary new elements in the secure e-mail system 10.

The sending units 18 and the receiving units 20 are suitable combinations of hardware and software. They may be either similar or different hardware, and in FIG. 1 this is emphasized by depicting the sending unit 18 and a first receiving unit 20a as being personal computers (PCs), and the second receiving unit 20b as being an Internet appliance.

The sending unit 18 must have sending capability, and in many cases it will also be utilized to compose the secure e-mail 14. However, composition capability is not necessarily a requirement and, for example, an Internet appliance such as a cell-phone with pre-stored standard messages may also be used. The receiving units 20 must be capable of receiving the secure e-mail 14 and they may, optionally, also have message composition and other capabilities.

With respect to the software required, each sending unit 18 and receiving unit 20 will need suitable e-mail type applications and suitable instances of the software modules 26. The e-mail type applications may be conventional e-mail applications, or they may be browsers having integrated e-mail capability, or they may be e-mail applets operating in conventional browsers. The software modules 26 will be described in more detail presently, but it can be noted here that these can be installed almost contemporaneously with their first use in a sending unit 18 or a receiving unit 20.

In FIG. 1 both a first receiver 16a and a second receiver 16b are depicted to emphasize that the secure e-mail system 10 may be used to send to multiple receivers 16. Thus, common e-mail addressing conventions such as "To . . . ," "Cc . . . ," "Bcc . . . ," etc. may be used, and the secure e-mail system 10 may also be used to concurrently send to lists of multiple receivers 16.

For the following overview discussion it is presumed that the sender 12 and the first receiver 16a are registered within the secure e-mail system 10 and that the sending unit 18 and the first receiving unit 20a have been suitably provisioned with appropriate instances of the software modules 26 to operate in their respective roles in the secure e-mail system 10. It is further presumed that the second receiver 16b has not yet registered within the secure e-mail system 10 and that the second receiving unit 20b has not yet been provisioned to operate with the secure e-mail system 10.

The overview of FIG. 1 also depicts the major stages of sending a secure e-mail 14 in a network environment 30, such as the current Internet. In a stage 32 the sender 12 decides to send the secure e-mail 14. An e-mail message is therefore composed in some manner, conventional or otherwise.

In a stage 34, rather than use a "Send" command the sender 12 instead uses a "Send Securely" command to request transmission of the secure e-mail 14. However, rather than transmit the unsecured e-mail message immediately to the e-mail server 22, the sending unit 18 first contacts the security server 24 and provides it with various data items (the respective data items used in this stage and others are described presently). The security server 24 then authenticates the sender 12 and replies to the sending unit 18 with a unique message key and id for the present secure e-mail 14. The security server 24 also logs various data items for this transaction which may be used later. Using the message key, the sending unit 18 now encrypts the secure e-mail 14. The message body, encrypted or otherwise, is never sent to the security server 24.

In a stage 36 the security server 24 determines whether the receivers 16 are registered. If so, as is the case here only for the first receiver 16a, this stage is finished for such receivers 16. However, if a receiver 16 is not registered, as is the case here for the second receiver 16b, registration is then attempted. For this the security server 24 sends an e-mail message to the second receiver 16b, informing him or her that an encrypted message will be arriving soon and that he or she will need to register in order to read it. The second receiver 16b can then follow a universal resource locator (URL), which is included in the e-mail sent by the security server 24, to a routine for registering with the security server 24. The second receiving unit 20b may already have the necessary software module 26 for receiving and decrypting the secure e-mail 14, or such may be provided as part of the registration process. Once the second receiver 16b is registered and the second receiving unit 20b has the necessary software module 26 installed, this stage is complete.

Alternately, stage 36 can be skipped in the secure e-mail 14. The secure e-mail 14 can itself include a universal resource locator (URL), in plain form, that the receivers 16 can follow. The security server 24 thus need not be concerned with whether the receivers 16 are registered. The sender 12 can prepare and send the secure e-mail 14, as already described, and the receivers 16 can deal with whether or not they are registered and can read the secure e-mail 14 upon its arrival.

In a stage 38 the sending unit 18 sends the now encrypted secure e-mail 14. This can be essentially transparent or seamless to the sender 12, being handled in the software module 26 of the sending unit 18 by passing the now encrypted secure e-mail 14 to a conventional e-mail type application and automatically providing a suitable "Send" command. The secure e-mail 14 then proceeds in conventional manner to the e-mail server 22, arriving in the inbox of each of the target receivers 16. Notably, the body of the secure e-mail 14 is encrypted during the entire time that it is passing between the sending unit 18 and the receiving units 20. Optionally, the subject may also be encrypted during this time.

In a stage 40 the secure e-mail 14 arrives in the inbox of each receiver 16. When a receiver 16 opens the secure e-mail 14, using their receiving unit 20, the software module 26 for the receiving unit 20 detects that the secure e-mail 14 is encrypted. Depending upon its configuration, the software module 26 can then prompt the receiver 16 for a password or use one already known to it.

Finally, in a stage 42 the receiving unit 20 contacts the security server 24 and provides it with the message id and data for the receiver 16 (including their password). Assuming that the receiver 16 is an authorized recipient (as determined by the list of recipients in the original message), the security server 24 provides the message key to the receiving unit 20. Optionally, the security server 24 can also provide an indication of whether the secure e-mail 14 was altered in any way. With the message key the receiving unit 20 decrypts the secure e-mail 14 and the receiver 16 is able to read it.

Figure 2A:
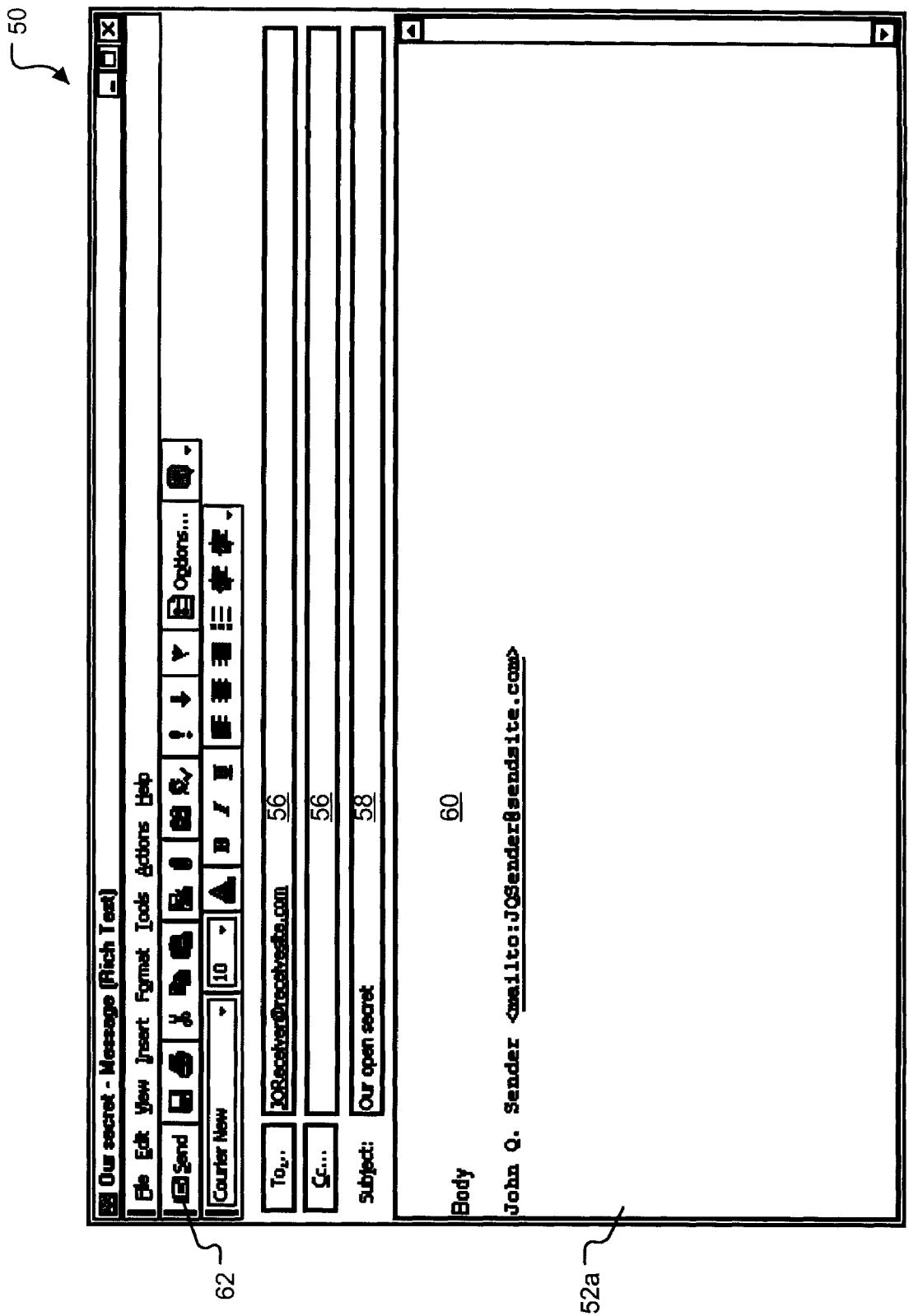
Figure 2B:
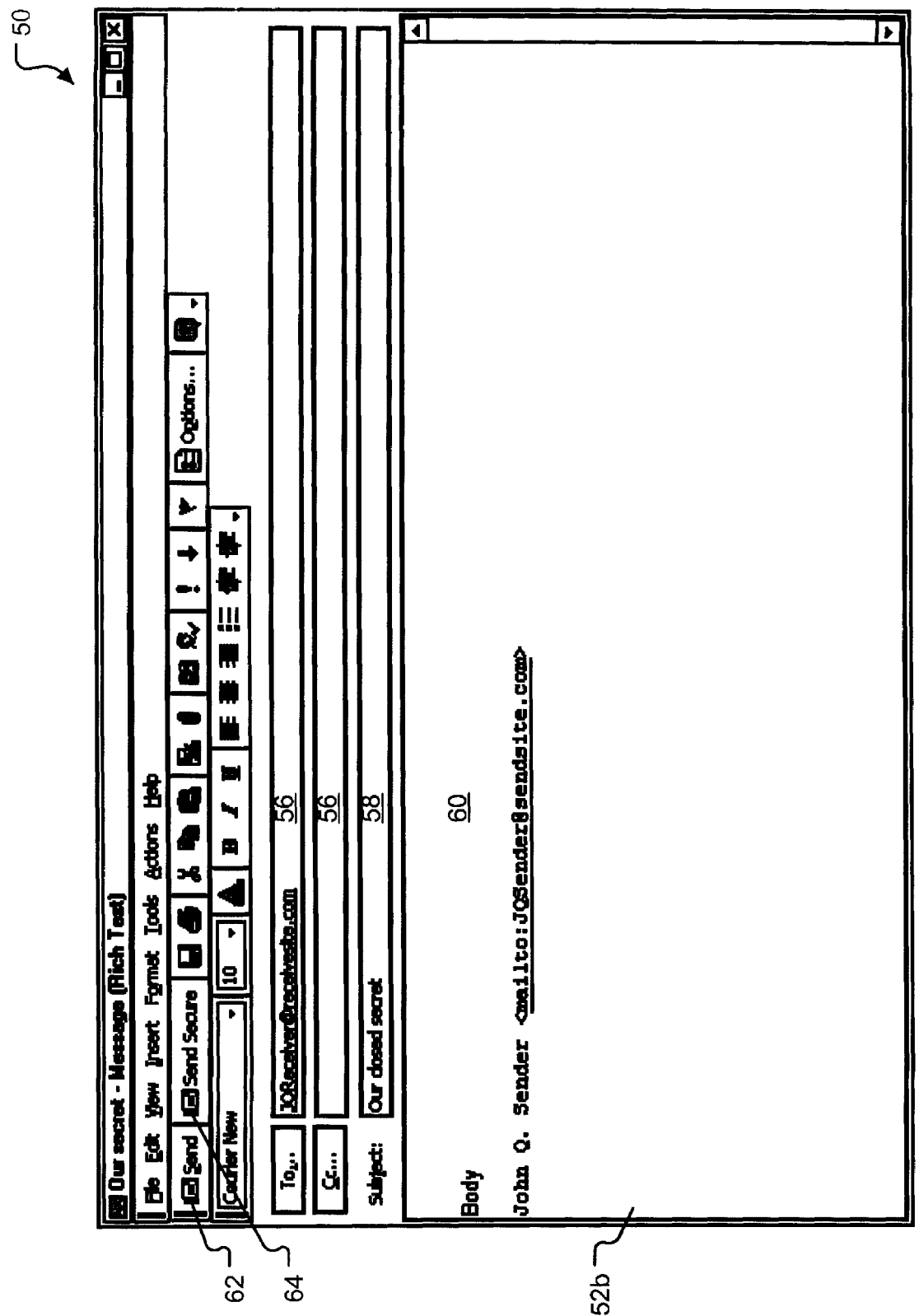
Figure 2C:
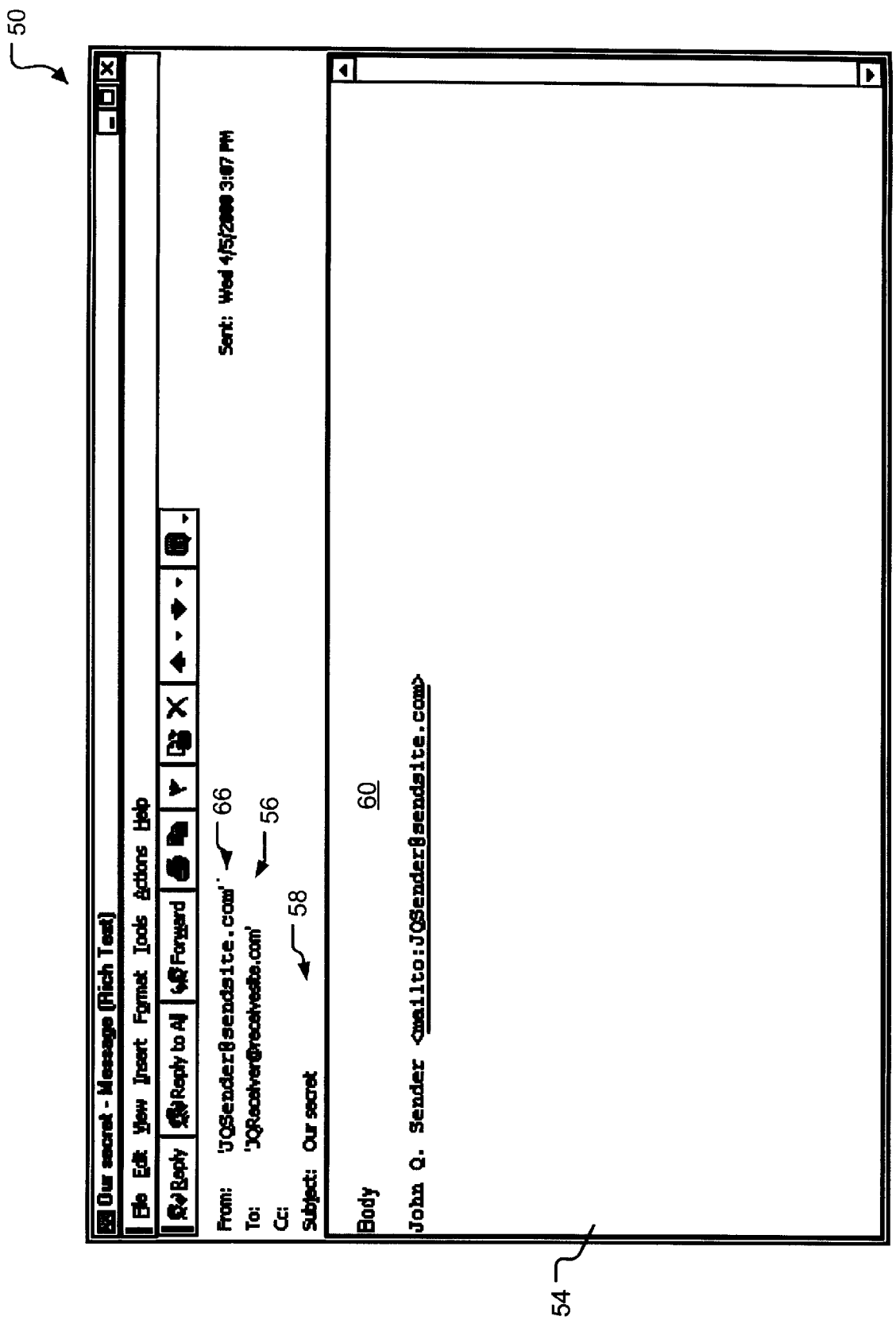

FIGS. 2a-c depict e-mail forms 50 which the secure e-mail system 10 may use. FIG. 2a is a conventional send form 52a. FIG. 2b is a send form 52b that is essentially the same as send form 52a, but that is modified to work with the secure e-mail system 10. And FIG. 2c is a conventional receive form 54 that can be used with the secure e-mail system 10.

The send forms 52a-b both include receiver id fields 56, subject fields 58, and body fields 60. They also both include a conventional send button 62. The only difference between the send form 52a of FIG. 2a (conventional) and the send form 52b of FIG. 2b (modified) is that the latter also includes a send securely button 64. While it may be desirable in some embodiments to entirely replace the send button 62 with the send securely button 64, that is not anticipated to become common. The receive form 54 of FIG. 2c includes receiver id fields 56 (To: and Cc:), a subject field 58, a body field 60, and also a sender id field 66. Understanding the various fields in these forms will be helpful for the following discussion.

Figure 3:
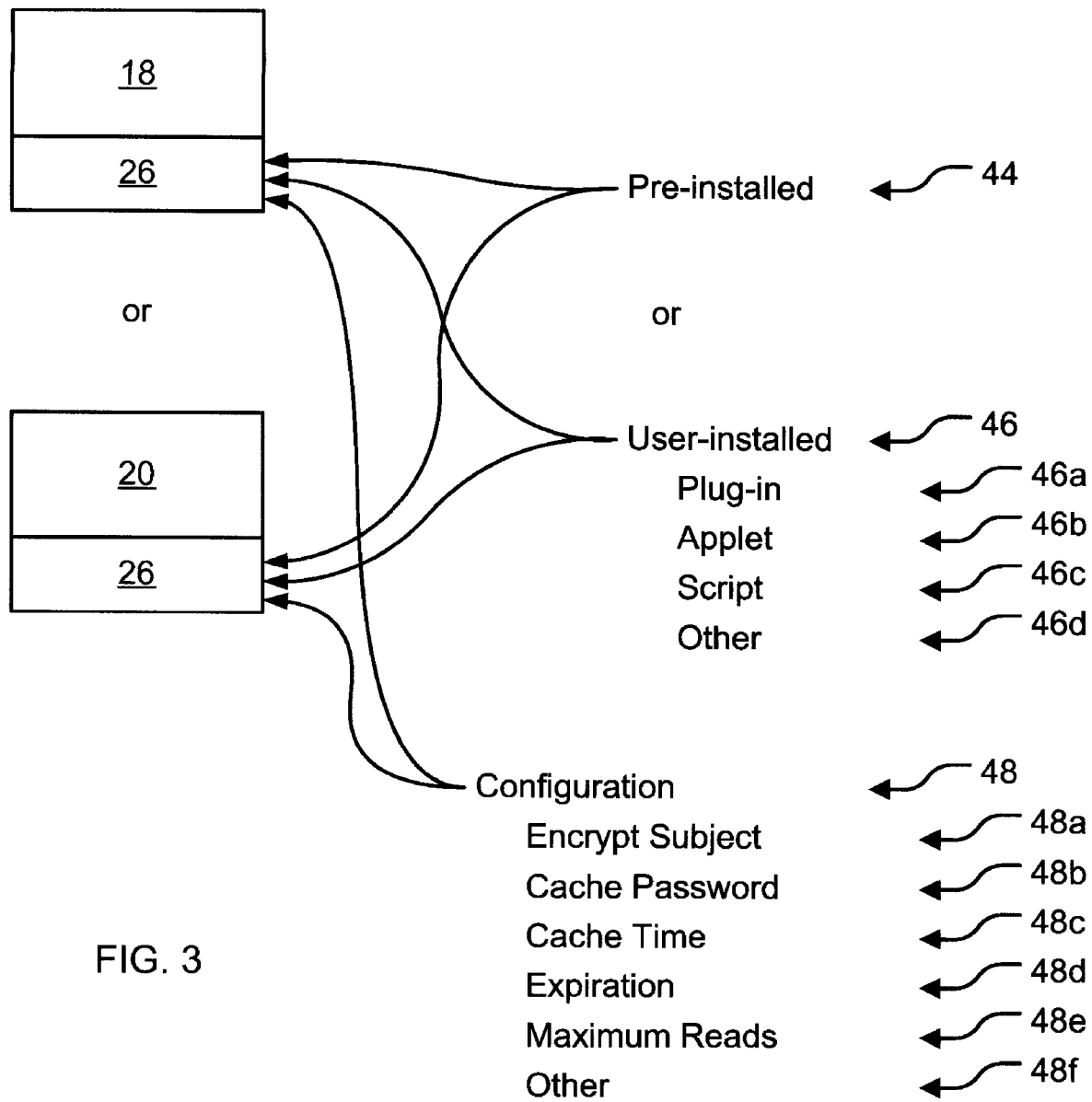
FIG. 3 is a block diagram depicting software modules which may be used in the sending and receiving units of FIG. 1.

FIG. 3 is a block diagram depicting the software modules 26 used in the sending unit 18 and receiving unit 20. In many embodiments of the secure e-mail system 10 the software modules 26 can be the same in both the sending unit 18 and the receiving unit 20, but this is not a requirement and different modules may also be used. The software modules 26 can be viewed as "client" side components of the secure e-mail system 10.

This figure also depicts various possible manners of installing the software modules 26 into the sending units 18 and receiving units 20. A pre-installed option 44 may be used whereby the underlying e-mail type application which is loaded onto a sending unit 18 or a receiving unit 20 comes with the software module 26 already included. Conventional e-mail specific applications or web-based e-mail applications may advantageously employ this preinstalled option 44.

Since a key goal of the secure e-mail system 10 is ease of use, employing it with web-based e-mail applications particularly facilitates operation by new users and simplifies operation by existing, sophisticated Internet users. Many Internet service providers (ISPs) today supply browser application software to their users. One example is America Online (AOL, ™), which provides its users with a pre-configured "private label" browser application. The pre-installed option 44 permits including the secure e-mail system 10 in the private label browser, and minimizes any set-up burden. Default settings can be set for any configuration options, and the senders 12 and receivers 16 can then optionally tailor the software modules 26 as desired.

Alternately, a user-installed option 46 may be used wherein the software modules 26 are installed by the senders 12 and receivers 16, i.e., the end users, into their respective sending units 18 and receiving units 20. This user-installed option 46 permits use of the secure e-mail system 10 by the large body of Internet users which do not use private label applications.

The user-installed option 46 may be implemented in many variations. One variation 46a is permanent installation of the software module 26 as a plug-in. Another variation 46b is transitory "installation" of the software module 26 as an applet upon each use of the secure e-mail system 10, e.g., aJava applet obtained by using a particular web portal such as Yahoo! (™). Still another variation 46c is a script driven installation, i.e., essentially a conventional full blown software application installation rather than a compartmentalized plug-in type installation. And yet other variations 46d are possible, say, combinations of those described or even new approaches to installation entirely.

These variations 46a-d may employ downloading from a closely controlled server, such as the security server 24 (FIG. 1). Alternately, some of these may involve distribution by other means, such as loading the software module 26 from a compact disc (CD). CDs are a common way that private label applications are distributed, particularly private label browsers. Rather than distribute an application with the software module 26 already installed according to the pre-installed option 44, an application distribution CD can simply include the software module 26 as an option which the user can decide to install via the user-installed option 46.

Obtaining the software module 26 online provides some peripheral advantages, however. The senders 12 and receivers 16 can formally become registered with the secure e-mail system 10 at the same time and they can comply with any other formalities, such as certifying that they are able to accept and use encryption technology.

The variations 46a-d, to different degrees, also may facilitate upgrade options. For example, every time a software module 26 contacts the security server 24 it can include version information as part of its communication. In sophisticated embodiments the software modules 26 may self-upgrade, from the security server 24 or elsewhere, as upgrades become available. In less sophisticated embodiments or where re-certification may be required, information can be sent regarding how to upgrade. For instance, an e-mail message including an upgrade site URL can be send to a sender 12 or receiver 16.

FIG. 3 also depicts some possible configuration options 48 which the senders 12 and receivers 16 may change in the software modules 26. Suitable defaults can be provided in most, if not all situations, but sophisticated users or particular situations may merit changing these settings. While such configuration options 48 generally should persist from session to session, consistent with good security practice they should be associated with a user and not merely with a machine. Thus, where multiple senders 12 or receivers 16 may use the same sending units 18 or receiving units 20, the users may be allowed to set independent personal configurations.

Particular examples of settings in the configuration options 48 may include: an encrypt subject setting 48a, a cache password setting 48b, a cache time setting 48c, an expiration setting 48d, a maximum reads setting 48e, and others 48f.

The encrypt subject setting 48a controls whether a software module 26 encrypts the subject field 58 (FIGS. 2a-c) as well as the body field 60 of the secure e-mail 14. The default typically will be to not encrypt the subject.

The cache password setting 48b permits specifying whether a password is required once per application session (e.g., per browser session), or whether a prompt requires the password every time it is needed. The default will generally be to cache the password but, as described next, this can work with a cache time setting 48c in a more secure manner. The password can also be cached only in memory and never to disk, for added security.

The cache time setting 48c works with the cache password setting 48b to control a maximum time which a password can be cached. Default and permitted maximum values for this might be 8 hours. A sender 12 could then shorten the cache time setting 48c, but not be allowed to lapse into poor security practices by specifying too high a time.

The expiration setting 48d allows a sender 12 to specify when the security server 24 (FIG. 1) should discard a message key, and thus make the secure e-mail 14 unreadable. The default will generally be to not explicitly force expiration, but after some substantially long period of time (perhaps years) the security servers 24 in most embodiments of the secure e-mail system 10 will probably need to do so.

The maximum reads setting 48e specifies the number of times that each receiver 16 can open and read a secure e-mail 14, i.e., the number of times that the message key will be sent to a single receiver 16. A default may be zero, meaning that there is no limit.

Of course, still other configuration options 48 may be provided, hence an others 48f element is present in FIG. 3 to emphasize this.

Once the software module 26 is installed in a sending unit 18 it is ready for use in message composition and send scenarios. A private label browser where the software module 26 is a plug-in type variation 46a will be used in the following discussion, but those skilled in the art will appreciate that the underlying principles are extendable, as well, to other systems which may use the secure e-mail system 10.

Figure 4:
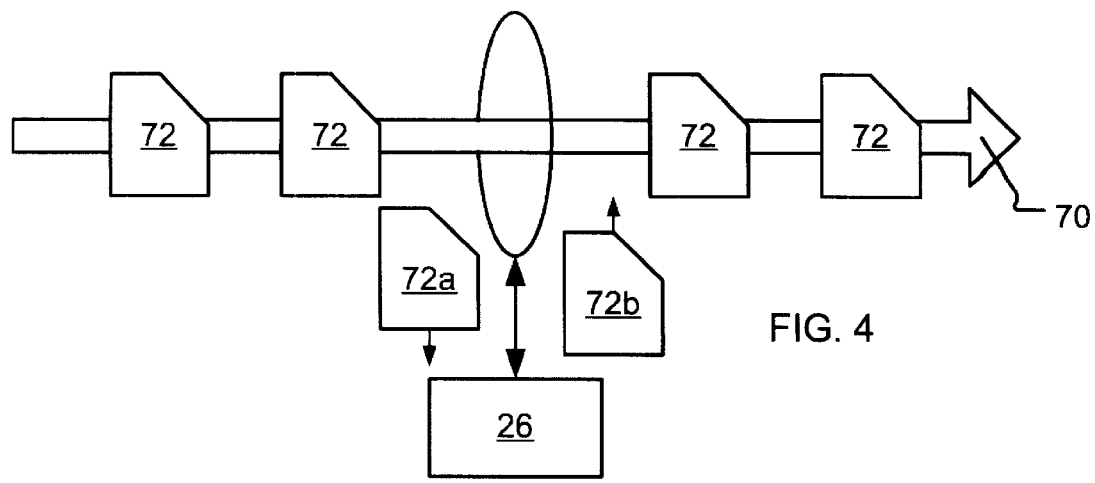
FIG. 4 is a block diagram stylistically depicting an approach for the software modules to determine whether a secure e-mail is being either sent or received.

FIG. 4 is a block diagram stylistically depicting a preferred approach for the software modules 26 to determine whether a secure e-mail 14 is being sent (or received). The software module 26 in the sending unit 18 examines a stream 70 of pages 72 looking for any which allow a sender 12 to compose a secure e-mail 14. One way to examine the stream 70 is for the software module 26 to see if the URL of a page 72 has a certain structure, e.g., "*mail.privatelabel.com*/Compose*" where * can match any pattern. Another way for the software module 26 to examine is to determine if the HTML content of a page 72 has a certain recognizable (static) pattern, e.g., the name of the form tag is "Compose." The software module 26 may also use MIME types to identify possible pages 72 to intercept. If an actual candidate page 72a is found it is removed from the stream 70, processed as now discussed, and replaced into the stream 70 as a processed page 72b.

Once the software module 26 determines that a page 72 about to be rendered is a composition type candidate page 72a, it needs to modify that candidate page 72a to include at least one new control, the send securely button 64 (FIG. 2b). Other controls in addition to this one button may be added if desired, but they are optional.

The send securely button 64 is "pressed" (operated, say, by a mouse click) by the sender 12 rather than their operating the conventional send button 62 when it is desired to send a secure e-mail 14. When the send securely button 64 is operated the software module 26 intercepts the page 72 (or form) containing the various fields of the e-mail which was about to be posted to the e-mail server 22, and modifies some of those fields. After this modification is complete the software module 26 executes the desired operation (post or send) exactly as would have happened had the sender 12 pressed the send button 62 in the first place. The only difference is that the values in some of the fields in the secure e-mail 14 will now be different, i.e., encrypted.

In the inventor's presently preferred embodiment only two fields are typically modified. The body field 60 is always modified by encrypting it. And depending on the configuration settings, specifically the encrypt subject setting 48a described above, the subject field 58 may also be changed.

Figure 5:
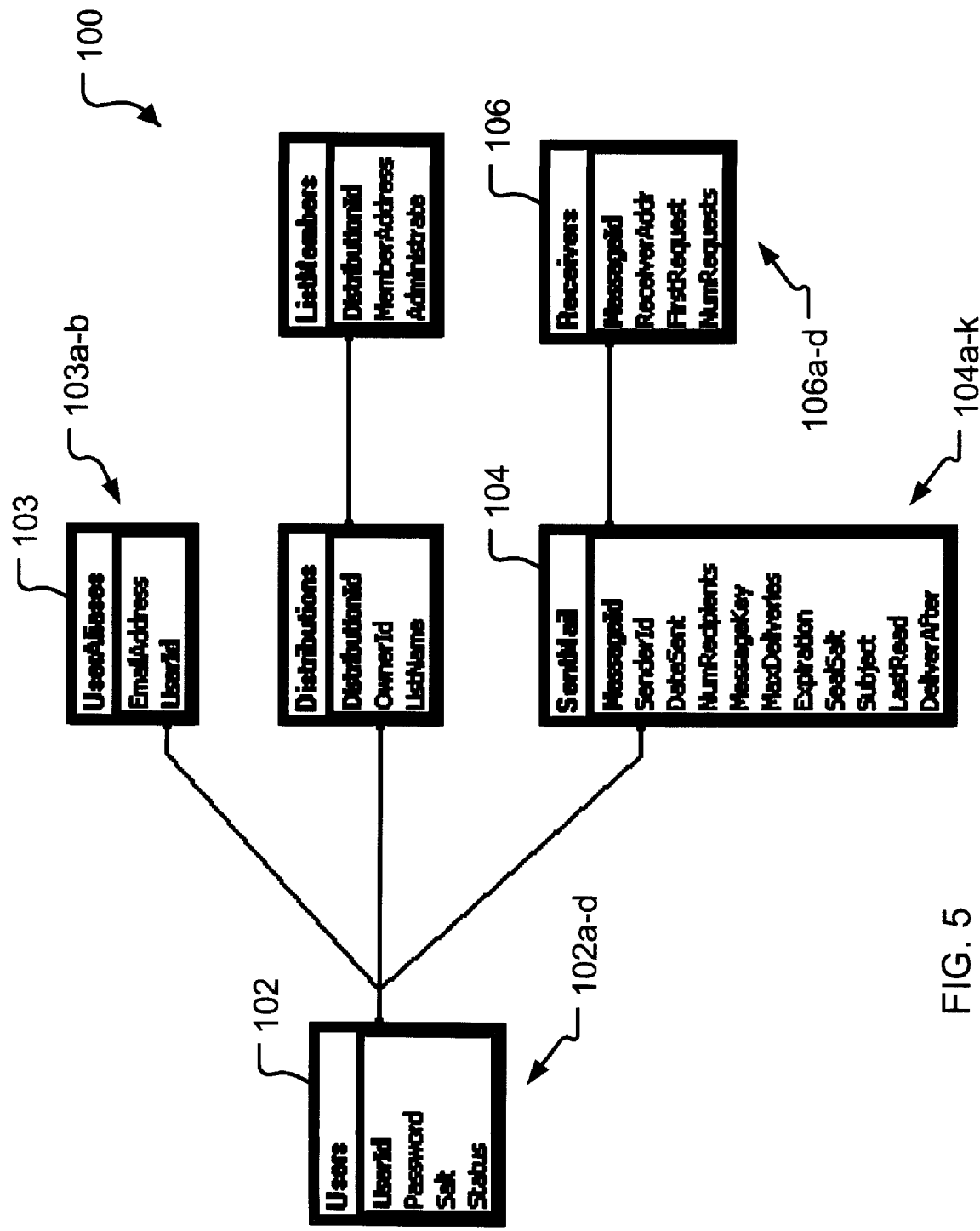
FIG. 5 is a diagram of a relational database including tables useable by the security server of FIG. 1.

Before examining the processes of encryption and decryption, some discussion of the various data items used by the secure e-mail system 10 is appropriate. FIG. 5 is a diagram of a database 100 including tables used by the secure e-mail system 10. The primary component of the security server 24 (FIG. 1) is this database 100. The registered senders 12 and receivers 16 are collectively treated within the database 100 as users, and data for them is stored in a users table 102.

The users table 102 includes records each having fields for: a userId 102a, a password 102b (actually a hashed version of the actual password in the preferred embodiment, as presently described), a salt 102c, and a status 102d.

Closely related to the users table 102 is a user aliases table 103, which includes records each having fields for: an e-mailAddress 103a and a userId 103b (relationally linked to the userId 102a in the users table 102).

The database 100 also includes a sentMail table 104. This includes records each having fields for: a messageId 104a, a senderId 104b, a dateSent 104c, a numRecipients 104d, a messageKey 104e, a maxDeliveries 104f, an expiration 104g, a sealSalt 104h, a subject 104i, a lastRead 104j, and a deliverAfter 104k.

A receivers table 106 is provided as well. As can be seen in FIG. 5, the messageId 104a in the sentMail table 104 is relationally linked to a messageId 106a in the receivers table 106. Thus, this receivers table 106 contains data for the receivers 16 specified in respective secure e-mails 14. The receivers table 106 further includes records each having fields for: a receiverAddr 106b, a firstRequest 106c, and a numRequests 106d.

FIGS. 6a-f are tables of the data fields used by the preferred embodiment. The tables in FIGS. 6a-d are important to the core operation of the secure e-mail system 10, while the tables of FIGS. 6e-f relate to optional features of the secure e-mail system 10.

The text in the tables of FIGS. 6a-d describes some of the particular fields, with the primary fields discussed further presently. FIG. 6a is the users table 102 of FIG. 5. This contains data records for each user, sender 12 or receiver 16, which is registered with the secure e-mail system 10. As each user registers, they are assigned a UserId (userId 102a) and they choose a Password (password 102b) that are stored here. The preferred value of the Password (password 102b) is H(p+s) where p is the cleartext password and s is a salt (salt 102c) concatenated with the cleartext password. FIG. 6b is the sentMail table 104 of FIG. 5. This contains data records for each secure e-mail 14 in the secure e-mail system 10. FIG. 6c is the receivers table 106 of FIG. 5. This contains destination data for each secure e-mail 14 which is to be deliverable by the secure e-mail system 10. Since a record gets generated in this table for each receiver 16 (individual or list group) of each secure e-mail 14 that is sent, it is expected that this table will be the largest by far in the secure e-mail system 10. A null value in the FirstRequest field (firstRequest 106c) implies that the receiver 16 has not requested to read the secure e-mail 14. FIG. 6d is the user aliases table 103 of FIG. 5. This contains data for all known e-mail addresses (e-mailAddress 103a) for each given user (userId 103b, relationally linked to userId 102a in the users table 102). Thus single users may be known by multiple e-mail addresses, or aliases.

The fields of FIGS. 6e-f are not discussed further beyond the following. These tables are used by optional features, and the text in them provides sufficient detail such that one skilled in the art can appreciate the uses of these fields. FIG. 6e is a table of the data used to permit the use of e-mail distribution lists. This table allows the users to create distribution lists. An owner can always update the list, but the owner need not actually be a member of the list. This latter feature is particularly useful for list administrators. And FIG. 6f is a table of the data used to permit the use of the distribution lists. This table contains data about the members of each distribution list.

Of course, other tables and other fields for other data than this shown in FIG. 5 and FIGS. 6a-f are also possible, and some of the above fields may be optional and can be omitted in some embodiments of the secure e-mail system 10.

Before encryption of a message can take place the software module 26 must obtain a password for the sender 12. If the password is cached, and if the cache time setting 48c has not been exceeded, this step is satisfied. Otherwise, the software module 26 can display a dialog box which prompts the sender 12 to enter their password. Conventional password handling features can be provided, such as displaying the password only as asterisks and permitting the sender 12 to cancel to abort sending.

In the preferred embodiment the passwords of the senders 12 and the receivers 16 are not the passwords 102b stored in the users table 102. Instead, as a heightened security option, the user picks a password, and this and the salt 102c are hashed by the security server 24 to obtain the password 102b. The user's chosen password is communicated to the security server 24, where a hash of it and the salt 102c takes place and is stored as the password 102b in the database 100. The cleartext of the user's password is not stored at the security server 24, only a computed hash which cannot be computed without the original password.

In this manner the security server 24 never need know, or be able to know, the actual user's password. This option is discussed further, presently.

Once the password 102b is obtained, the software module 26 can perform the operations of encryption and actual sending. In general, the software module 26 sends a request to the security server 24 via secure socket layer (SSL) protocol to authenticate the sender 12 and to obtain back a messageKey 104e for use to encrypt the secure e-mail 14. The software module 26 then encrypts the body field 60 (and optionally also the subject field 58) of the message and the result is then separately encoded to create the secure e-mail 14.

The use of secure socket layer (SSL) was mentioned above. Since a goal of the present secure e-mail system 10 is ease of use, the inventor's present preferred embodiment employs SSL. It is currently considered secure in the industry, being widely used in common browsers, with the average Internet user today using it and not even being aware that they are doing so. It should be appreciated, however, that the use of SSL is not a requirement. Other security protocols may alternately be used.

These notations are now used in the following discussion:
$K_m$=One-time, unique key associated with an e-mail;
$P_s$=Sender's password;
$P_r$=Receiver's password;
$\{p\}_k$=p encrypted with key k;
$\{p\}_{ssl}$=p encrypted with the SSL session key; and
$H(p)$=One-way hash of p.

Figure 7:
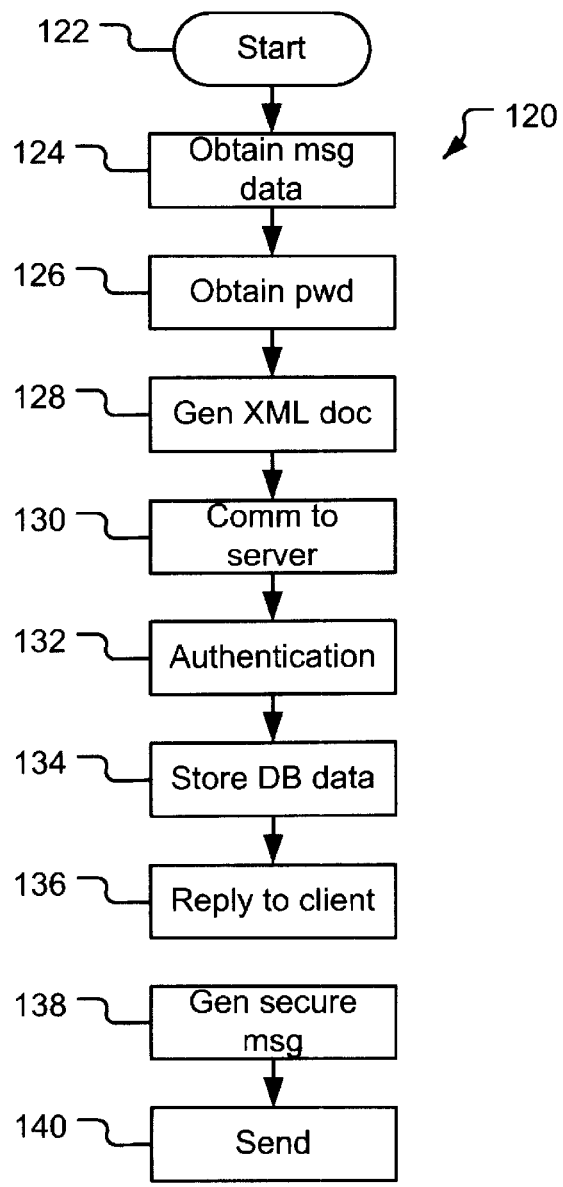
FIG. 7 is a flow chart depicting an encryption process that is usable in the embodiment of FIG. 1.

FIG. 7 is a flow chart depicting the presently preferred encryption process 120. At the time the sender 12 is ready to send a secure e-mail 14, an HTML send form 52b (FIG. 2b) is present with plaintext in the body field 60. It is assumed here that the sender 12 has already registered with the security server 24 and that an appropriate software module 26 has been installed into their browser. It is also assumed that the sender 12 is using only a browser to send the secure e-mail 14. The security aspects should be the same regardless of the actual mail client used, and this is used to keep the following explanation simple.

As described previously, the sender 12 selects the send securely button 64 on the send form 52b when they are ready to post. This constitutes a step 122, the start of the encryption process 120.

In a step 124, a script runs which passes the following information to the software module 26 in the sending unit 18:
the e-mail address of the sender 12 (e-mailAddress 103a);
the contents of the To:, CC:, and BCC: fields (instances of receiverAddr 106b);
the contents of the subject field 58; and
the contents of the body field 60.

In a step 126, if the software module 26 did not already know the password for the sender 12 it prompts for it. It is a matter of security policy choice whether to require the password to be entered on each send, since this could be unduly cumbersome in some cases. Caching the user's password, and thus also the password 102b, in the software module 26 may be insecure if the sender 12 leaves the browser session open. While the policy will often be to allow the sender 12 to choose how to configure this option, there will also be some cases, e.g., at public kiosks, where it should always be required that a password be entered for each secure e-mail 14.

In a step 128 the software module 26 creates an XML document in the following format, which will be the one encrypted:
<?xml version="1.0" encoding="ASCII"/>
<e-mailPart random="randomNum" length="numChars" mic="messageIntegritycode">
<subject>subject</subject>
<body>body</body>
</e-mailPart>.

Here the random element is an anti-cracking feature, it is a large random number used to ensure that even e-mails that are the same in content are not the same when secured; the length element is the number of characters in the body field 60; the mic element is a message integrity code created by taking a hash of the body field 60; the subject element is the contents of the subject field 58; and the body element is the contents of the body field 60.

In a step 130 the software module 26 opens an SSL HTTP (HTTPS) connection to the security server 24, and sends it the following information:
the e-mailAddress 103a of the sender 12;
the password 102b for the sender 12;
a list of target receivers 16 (receiverAddr 106b, and implicitly numRecipients 104d);
the subject field 58 of the message (subject 104i);
a list of computed hashes, one for the body, H(b), and one for each attachment, $H(a_1)$, $H(a_2)$ ... $H(a_n)$; and
optional configuration information such as an expiration time or maximum number of deliveries allowed per recipient.

In a step 132 the security server 24 proceeds depending on the result of an authentication sub-process.

1) If the e-mailAddress 103a for the sender 12 is unknown, the encryption process 120 can determine a known e-mailAddress 103a or stop. The e-mailAddress 103a might be unknown for various reasons. One common example will be that the sender 12 is new to the security server 24. In this case the software module 26 can be directed to open a separate browsing window which allows the sender 12 to register on the spot. Another reason that the e-mailAddress 103a can be unknown is due to a user error. One simple source of such errors can be that multiple users share the same browser. A sender 12 can then be requested to clarify their identity.

2) If the password 102b of the sender 12 is incorrect, the software module 26 can be instructed to prompt for the password 102b again (perhaps only a limited number of times), or let the sender 12 abort their sending operation (which returns them back to the original HTML send form 52b).

3) If the sender 12 is not allowed to send secure e-mails 14 the encryption process 120 can also stop. This can be for administrative reasons. For example, if the sender 12 has not paid a fee or if there is a court order preventing a user from using this encryption service, etc. The reason for a denial can then be stated in a dialog box that, when acknowledged, can return the user to the original HTML send form 52b (perhaps to instead use the send button 62, and to send the message as a conventional e-mail).

Otherwise, the sender 12 is considered to be authenticated and is allowed to send the presently contemplated secure e-mail 14, and this step 132 is successfully complete.

In a step 134 the security server 24 then creates and populates a record in the sentMail table 104. In particular, unique values are generated here for a messageId 104a (m), a messageKey 104e ($K_m$), and a list of computed seals (sList) for each part of the secure e-mail 14 being sent. The security server 24 computes the seals in sList as $H(H(H(x)+s+t+m+N_m)+N_m)$. The element s is userId 102a of the sender 12; t is the date and time (also stored as dateSent 104c in the sentMail table 104); m is the messageId 104a; $N_m$ is the sealSalt 104h (a random number generated for this particular secure e-mail 14, but separate from the messageKey 104e); and H(x) is from the set of hashes $H(b), H(a_1), H(a_2) \ldots H(a_n)$ received from the software module 26. Note, the contents of sList need not be stored, since they should be re-computable.

In a step 136 the security server 24 responds back to the software module 26 of the sending unit 18 with an SSL packet of information in the form $\{m, K_m, sList\}_{SSL}$.

In a step 138 the software module 26 extracts the messageId 104a (m), the messageKey 104e ($K_m$), and the seals from sList, and proceeds to encrypt the above XML document and each attachment with the messageKey 104e. The software module 26 then destroys that key from memory in the sending unit 18. Specifically, the software module 26 creates a message form having the following general format:

----------BEGIN SECURECORP SECURED EMAIL----------
<securecorp:messagePart id="m">
<encrypted Part>encrypted body</encrypted Part>
<seal>seal</seal>
</securecorp:messagePart>
----------END SECURECORP SECURED E-MAIL----------

If this part of the secure e-mail 14 includes an encrypted body, this is converted from a raw bit stream (post encryption) to an encoded stream so that the encrypted body element is composed of rows of printable (ASCII) characters. If this is an attachment, that is not necessary.

Finally, in a step 140 the software module 26 performs the same action as if the sender 12 had pressed the send button 62 in the send form 52b in the first place. It posts to the e-mail server 22 (perhaps via an e-mail capable web server, e.g., Yahoo(™), Hotmail (™), etc.). The difference is that the value in the body field 60 of the form being posted is now encrypted and encoded as described above. Similarly, any attachments are encrypted as described above. From the point of view of a conventional e-mail server 22 or a web server, the result looks like a normal e-mail message whose body is just a bunch of gibberish. The secure e-mail 14 can then travel through the normal Internet mail system to arrive at its various destinations.

Attachments were not covered in much detail in the above discussion, but they can easily be handled as well. In the preferred embodiment attachments are each treated much like a body field 60, except that they are not wrapped in XML or encoded (turned into ASCII). Instead a binary header is added which includes protocol version information; a new length element, like that for the body; a copy of the same messageId 104a used for the body of the secure e-mail 14; a new mic element created by taking a hash of the attachment body; and a seal (as discussed for sList, above). The attachment is then encrypted using the same messageKey 104e as was used for the body of the secure e-mail 14 the header is added to it, and the result is uploaded to the e-mail server 22 in the usual manner.

This approach for attachments has a number of advantages. The database 100 of the security server 24 need not be disturbed by this approach to handling attachments, since the verification mechanism for them is thus carried within the secure e-mail 14 and is protected by the security features applicable there. This can also support any number of attachments. Each attachment is added to the object which will be passed into the software module 26 that does the encryption. Each attachment is encrypted using the same messageKey 104e as the body of a message, and the hash of each attachment can be computed using the same algorithm. By giving each attachment a full header it can be decrypted separately from any other attachment or even from the body. By separating the attachments it can also be determined if any particular attachment has been altered. The normal operations on the rest of a secure e-mail 14 can be performed even if the attachments are purposely not included, e.g., when replying to a secure e-mail 14 having attachments.

As noted above, the secure e-mail 14 travels through the normal e-mail system to the inbox of each receiver 16. The receivers 16 can typically go to a screen in their browsers where a summary of all messages that have been received is presented. By clicking on a message summary the browser can then deliver a page formatted with the message in it. This, however, requires that a suitable software module 26 is present.

Once a software module 26 is installed in the receiving unit 20 it is ready for use in message receive and read scenarios. A private label browser where the software module 26 is a plug-in variation 46a is also used in the following discussion, but those skilled in the art will here also readily recognize that the underlying principles are extendable to other systems using the secure e-mail system 10.

Returning briefly to FIG. 4, this also stylistically depicts the preferred approach for the software modules 26 to determine whether a secure e-mail 14 is being received. The software module 26 in the receiving unit 20 examines the stream 70 of pages 72 looking for any that contain a secure e-mail 14. The software module 26 can determine whether a page 72 contains a secure e-mail 14 by scanning for "---------- BEGIN SECURECORP SECURED E-MAIL ---------" type tags. This can be done quickly, permitting minimal latency in delivering pages which should not be processed further. If an actual candidate page 72a is found it is removed from the stream 70, processed as now discussed, and replaced into the stream 70 as a processed page 72b, and thus made available for reading by the receiver 16.

Figure 8:
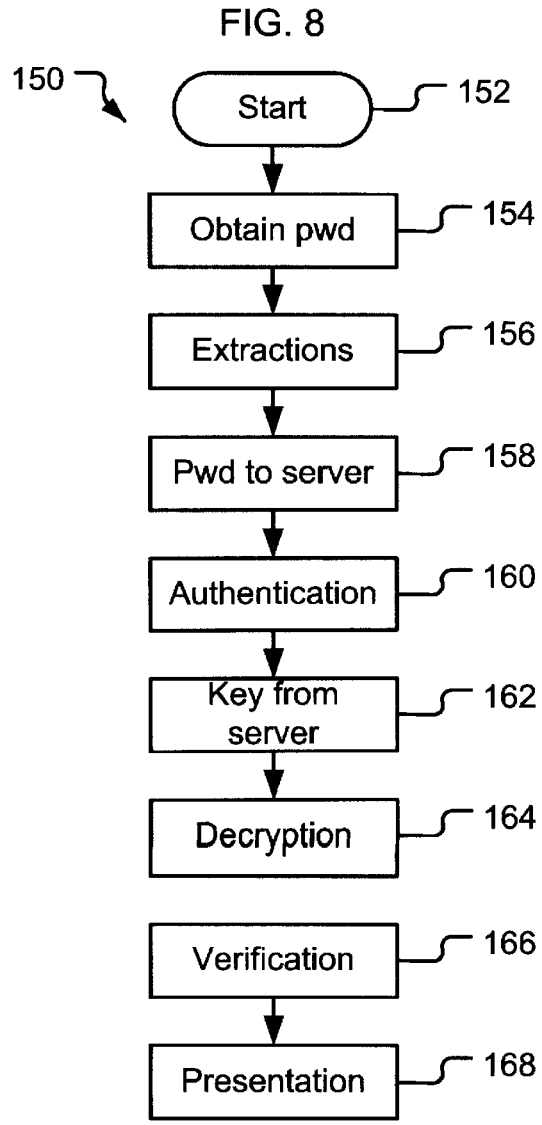
FIG. 8 is a flow chart depicting a decryption process usable in the embodiment of FIG. 1.

FIG. 8 is a flow chart depicting the presently preferred decryption process 150. It is here also assumed that the software module 26 has already been installed within a browser running on the receiving unit 20 of a receiver 16, and that the receiver 16 has registered with the security server 24 (the security server 24 perhaps having already generated an e-mail to any receivers 16 not previously registered). Once a secure e-mail 14 (i.e., a secured and sealed XML document created according to the encryption process 120) is selected by the receiver 16, the software module 26 performs the operations of decryption to permit reading of the secure e-mail 14 by its receiver 16. This constitutes a step 152, the start of the decryption process 150.

In a step 154 the password for the receiver 16 is obtained. Recall that both the senders 12 and the receivers 16 are treated as users by the security server 24, and both have equivalent entries in the users table 102 (FIG. 5). If the password 102b is not already cached, the receiver 16 is prompted to enter their password. The rules for password caching, prompting, etc. may be the same as for sending.

In a step 156 the software module 26 extracts the messageId 104a, decodes (if encoded) the received message and extracts the body field 60 (still encrypted).

In a step 158 the following information is then sent to the security server 24 (via SSL):
the e-mail address of the receiver 16 (e-mailAddress 103a);
the password 102b of the receiver 16; and
the messageId 104a.

In a step 160 the security server 24 proceeds depending on the result of an authentication sub-process.

1) The security server 24 hashes the receiver's password with the salt 102c to determine the password 102b.

2) The password 102b is verified, based in part on association with the e-mailAddress 103a of the receiver 16. If this part of the authentication fails, the response to the software module 26 results in the receiver 16 being prompted for the correct password 102b or the decryption process 150 aborting.

3) It is determined whether the receiver 16 is authorized to read the present secure e-mail 14. For this, the e-mail address of the receiver 16 must match the receiverAddr 106b in the receivers table 106 for the particular messageId 106a, the numRequests 106d must be less than the maxDeliveries 104f for this secure e-mail 14, and the expiration 104g must not indicate that the message has already expired. If this authorization fails, the response to the software module 26 results in notifying the receiver 16 and then exiting the decryption process 150 without decrypting the secure e-mail 14.

Note, if either of these tests fail, the browser page can simply display as if it does not contain encrypted material, i.e., as unintelligible gibberish where the body field 60 would normally be. The sender id field 66, the various receiver id fields 56, and possibly also the subject field 58 (depending upon configuration) can still be intelligible, however. The receiver 16 may thus be able to contact the sender 12 or any other receivers 16 to determine if the secure e-mail 14 was important and if measures outside the secure e-mail system 10 are appropriate. If these tests are successful, the receiver 16 is considered to be authenticated and this step 160 is complete.

In a step 162 the security server 24 sends the messageKey 104e back to the software module 26 of the receiver 16 via SSL.

In a step 164 the software module 26 decrypts the secure e-mail 14, using this same messageKey 104e and the reverse of the basic process as was used to encrypt it.

In a step 166 the software module 26 validates the secure e-mail 14. This involves a second round of communications with the security server 24. The software module 26 generates new hashes of each part of the secure e-mail 14 and sends these and the seals included in each message part to the security server 24. The security server 24 then computes new seals, based on the passed in hashes, which it compares with the passed in seals. If there are any differences, this is an indication that the secure e-mail 14 is not authentic. The security server 24 then sends an indication about the authenticity of the secure e-mail 14 back to the software module 26.

Finally, in a step 168 an HTML receive form 54 is presented to the receiver 16 showing the plaintext body field 60 of the secure e-mail 14 where the encrypted message used to be. Further, if the indication about authenticity from the security server 24 was negative, the software module 26 presents a message advising the receiver 16 in this regard as well.

Also in the preferred embodiment, as an optimization of in the decryption process 150, the software module 26 caches the messageKey 104e so that the same message can be read again within the same session without accessing the security server 24. However, this is only for read operations and the messageKey 104e is never stored on disk.

Decryption of any attachment is simply performed using the same messageKey 104e and the same basic process. The only differences are that a binary header is used, as described earlier, and the information in an attachment is not encoded.

In summary, the software modules 26 of the preferred embodiment should: intercept and parse HTML pages before they are rendered; selectively modify HTML pages before they are rendered; extract data from HTML forms and pages; send data to a security server via a secure means (e.g., secure HTTP, SSL); perform symmetric key encryption and decryption using the same algorithm for both actions (e.g., Blowfish symmetric key encryption/decryption); perform hashing (e.g., secured hash algorithm one, SHA-1); display dialog boxes (for password entry, configuration, error messages, and seal verification results); and, preferably, be able to self-upgrade.

The security features underlying the preceding encryption process 120 and decryption process 150 bear some further analysis. For authentication purposes, the operator of the security server 24 knows the sender 12 because their e-mailAddress 103a should associate with their password 102b. If the password 102b is treated the way it is supposed to be, i.e., only the holder should know it, then the operator of the security server 24 can be sure that only the sender 12 could have sent a particular secure e-mail 14. But the sender 12 does not necessarily even have to be trusted. By storing the sealSalt 104h initially, it is also possible for the operator of the security server 24 to be sure that no one, including the sender 12, can alter a secure e-mail 14 after it is sent. As an added security feature the sealSalt 104h may be stored encrypted in the database 100, and then never shared and never allowed to leave the security server 24. By encrypting the hashes of the body and attachments (H(b), H(a)) with the SSL key after the sender 12 has been authenticated (by providing the password 102$b$) it is possible to determine that it is the sender 12 who is signing their secure e-mail 14. Because the security server 24 stores only a hash of the actual password of the sender 12 as the password 102$b$, there is no way even the operator of the security server 24 can falsely sign a secure e-mail 14 on behalf of the sender 12.

Because the messageKey 104$e$ is symmetric and because an outside entity is storing it, i.e., the security server 24, it is possible for someone to decrypt a secure e-mail 14 if they have intercepted both the secure e-mail 14 and also obtained its messageKey 104$e$, say, by breaking into the database 100. Interestingly, just having one or the other here does not do any good. This approach can be even further strengthened by encrypting the messageKey 104$e$ with a public key. Then, breaking into the database 100 still does not help, since one would need the appropriate private key to be able to obtain the messageKey 104$e$ needed to crack any given secure e-mail 14. A brute force attack on the database 100 therefore becomes infeasible. Also, to the extent possible, the operators of the security server 24 can put the necessary private key into actual hardware, making it virtually impossible to break into the database 100 without physical access to the actual machines being employed.

Reading a secure e-mail 14 is simpler than sending it. The only concern here is that there is a single key per message (messageKey 104$e$) used for decryption. Therefore there is a moment within the software module 26 where that key is in the clear on the receiver's machine and it is possible to access it. However, all that permits is reading the current secure e-mail 14 which the receiver 16 is allowed to read anyway. Hence, there is only a risk here if an unauthorized person can gain access to the key for the brief time that it is in memory. This would be extremely difficult, and it follows that, if the key could be stolen in this fashion, the decrypted message could just as easily (if not more so) also be stolen. So why bother with the key? In sum, this is not much, if any, of a security risk.

The use of the seal provides for non-repudiation via the operator of the security server 24 acting as a trusted third-party notary. In particular, a judge can determine whether a message was actually sent from a sender 12 by giving the operator of the security server 24 the seal, the hash of the message and the name (to map to the userId 102$a$) of the sender 12. As was described for the preferred embodiment, a receiver 16 can verify that a seal is genuine (which proves that the sender 12 actually wrote and sent a particular secure e-mail 14), by sending the seal and a hash of the body of the received message to the security server 24. The security server 24 can then provide an assurance in this regard. The seal is used at the security server 24 to determine whether it is genuine by recomputing it based on the three known quantities. This technique is known as "non-repudiation with secret keys" and is taught by Kaufman et al. in "Network Security: Private Communication in a Public World," Prentice-Hall, 1995, pp.343-44.

Obviously, much of the security in the embodiments described here is also based on the strength of SSL. Currently, this seems to be an accepted standard, so we will not concern ourselves here with the fact that both the password 102$b$ of the sender 12 and the messageKey 104$e$ are sent over it. However, the strength of the security of the secure e-mail system 10 is not dependent on SSL. As more secure protocols for protecting a communications channel become available (e.g., Transport Layer Security or TLS), the secure e-mail system 10 can easily use such a protocol.

Up to this point the discussion has been primarily presentation of the secure e-mail system 10. The concept of a key server can, however, be used much more generally to build and deploy a variety of solutions that address the problem of secure communication. For example, this approach can also particularly facilitate enterprise instant messaging (EIM), video-conferencing, and secure realtime document editing. These are just additional examples of communication schemes employing message headers to deliver or route message content, and the a key server can be used with effectively any such communication scheme.

The solutions key servers provide are also particularly suitable for collaborative use by organizations. By using key servers, organizations can satisfy the most stringent security requirements while enabling their constituents to freely and easily collaborate via a rich set of techniques and media.

The following terms are used frequently throughout the rest of this document and are defined here for convenience:

Confidentiality protection—Ensuring that data can only be viewed by authorized recipients, irrespective of the data location (i.e., in transit or in storage).

Conversation key—A symmetric key that protects conversation data. Conversation data flows from a single source to one or more destinations.

Hub—The network server that processes messages and relays them to appropriate destinations.

Integrity protection—Ensuring detection of unauthorized modification to data in transit or in storage.

Join—To start participating in a collaboration.

Key server—A network server that holds protection keys and releases them to authorized users.

Leave—To stop participating in a collaboration.

Header key—A symmetric key that protects the header of a message. Header keys are individually established between the hub and each spoke.

Message—The basic unit of data exchanged between collaborating parties. A message has two parts, a "header" and "content." Message content—Data that is produced by a collaborating party and is destined for one or more other parties.

Message header—Data that helps the message router deliver the contents to its destinations.

Protection—Confidentiality and integrity protection.

Spoke—Senders or receivers of data; spokes do not relay data.

Transcript—A record of some part of the collaboration.

Figure 9:
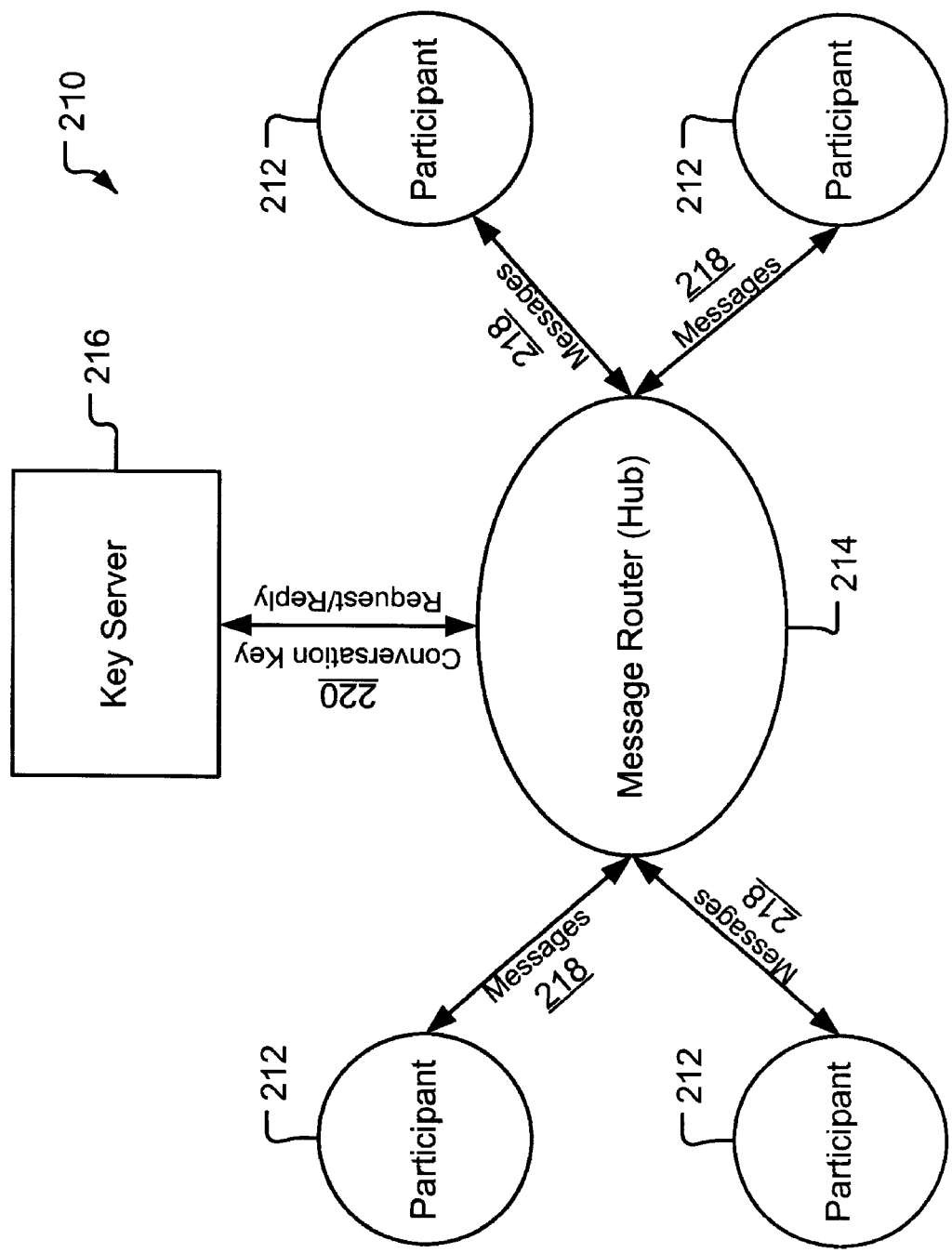
FIG. 9 is a schematic block diagram depicting the major components of a generic embodiment for secure collaboration and key exchange.

FIG. 9 is a schematic block diagram depicting the major components of a security server system 210. Although mostly generalized, this embodiment is particularly suitable for collaborative communication in an enterprise. The major components here include collaboration participants 212, one or more message routers 214, and one or more key servers 216. Accordingly, the collaboration participants 212 here are equivalent to the sending unit 18 and receiving units 20 in FIG. 1. The message router 214 is equivalent to the e-mail server 22 in FIG. 1 (or conventional routers). As described presently, however, the message routers 214 here may particularly be under the control of an enterprise using the security server system 210. The key server 216 in FIG. 9 is equivalent to the security server 24 in FIG. 1.

The collaboration participants 212 are the source (source participant 212$a$) and/or the destination (destination participant 212$b$) for the messages 218. As described presently, conversation keys 220 are used to protect the contents of the messages 218.

The message routers 214 deliver the messages 218 to the intended collaboration participants 212. Although the messages 218 may actually pass through multiple message routers 214, this is illustrated in the figures conceptually with just one message router 214 (or the e-mail server 22 and the possible routers through which a secure e-mail 14 might pass). When multiple message routers 214 are present, each "sees" the others much like it sees a collaboration participant 212. The collaboration participants 212 each maintain at least one persistent connection with the message router 214 (or the "closest" message router 214).

The key server 216 creates the conversation keys 220 or it can receive them from source participants 212a. The key server 216 then stores and releases the conversation keys 220 to the parties that are the collaboration participants 212 (presumably after authentication and authorization, but various schemes can be used for that and it is not a topic that is germane here). The key server 216 can also create or store conversation keys 220 in bulk, releasing an arbitrary number upon request. A client that is a serverclass device (e.g., an e-mail gateway) can thus get a bulk set of conversation keys 220 and protect each message 218 with a unique one, without needing to ask the key server 216 for a unique conversation key 220 every time.

To simplify the following discussion, encryption and decryption is used as the primary example of protection. Encryption/decryption with a key protects the confidentiality of a message. It should be appreciated, however, that this is only one possible example of protection. The integrity of a message can be protected using a keyed message digest (also known as Hashed Message Authentication Code, or HMAC), or both types of protection can be applied. For example, the key server 216 can create a 256-bit key and release it to a source participant 212a. The source participant 212a can then use the first 128 bits for encryption and the second 128 bits for HMACing.

Since the conversation keys 220 are used for encryption or hashing and later need to be retrieved for use in decryption or hash analysis, the key server 216 associates a unique ID with every conversation key 220. The unique ID, or something from which it can be derived, is then sent in the clear with each protected message 218. Thus, a collaboration participant 212 submits a request for a conversation key 220 to the key server 216 and the key server 216 responds with a reply back to the collaboration participant 212 containing the requested conversation key 220. The key server 216 is generic and can be used to manage the conversation key 220 for any type of application. The session between the collaboration participant 212 and the key server 216 thus is a secure session.

FIG. 1 and FIG. 9 differ in a major respect that illustrates an optional but highly useful feature. In FIG. 1 the e-mail server 22 and the security server 24 are depicted as having no direct communication. This scheme works well, for example, if the e-mail server 22 (or message hub used in its stead) is conventional. In contrast, in FIG. 9 the message router 214 and the key server 216 are depicted as having direct communication. This scheme works well if the message router 214 is designed to work in the security server system 210. The message router 214 can then be the entity that instructs the key server 216 to create new conversation keys 220 when a collaboration participant joins or leaves a conversation.

Figure 10:
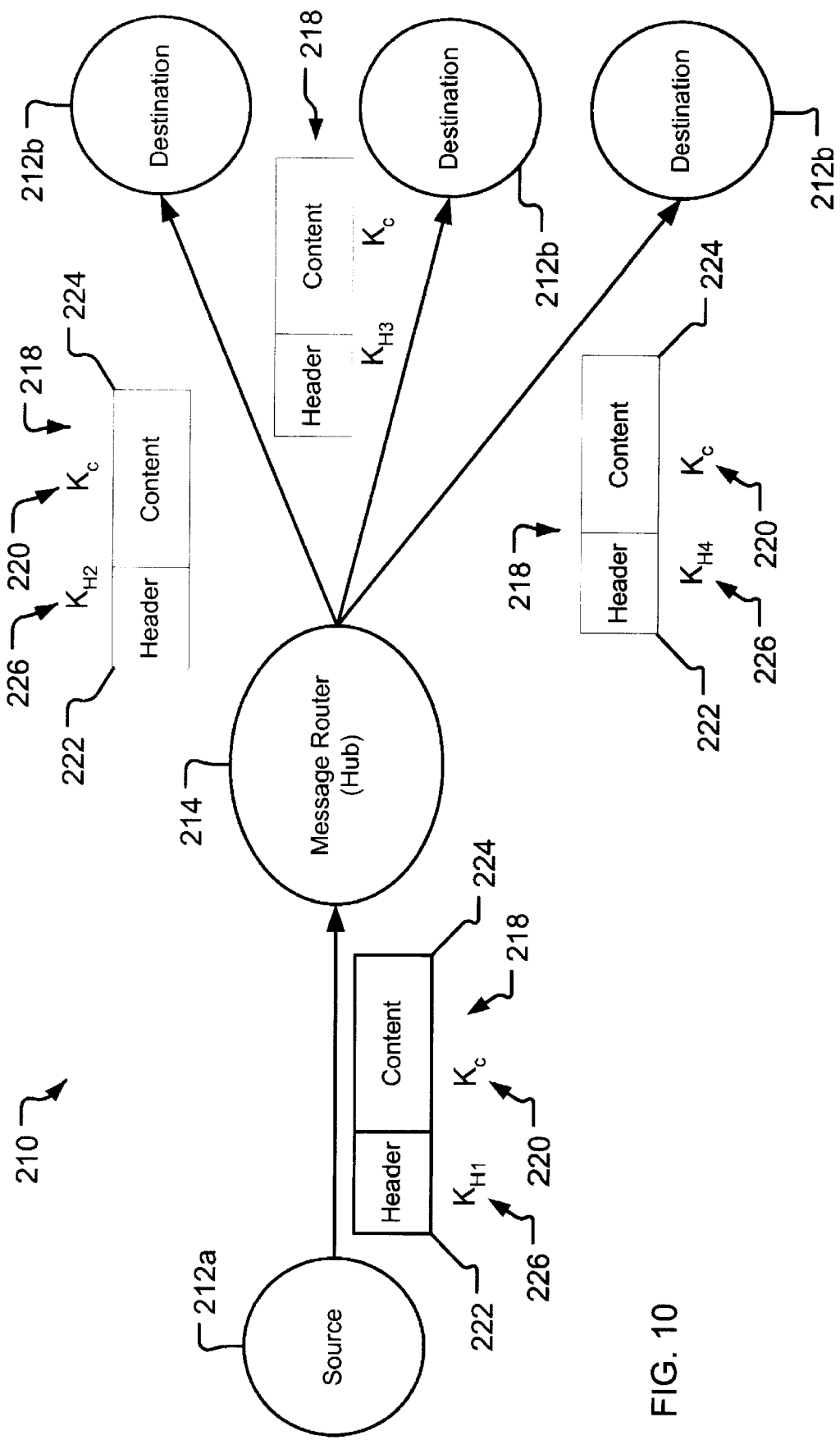
FIG. 10 is a schematic block diagram depicting the typical flow of a message in the generic form in FIG. 9.

FIG. 10 is a schematic block diagram depicting the typical flow of a message 218 in the security server system 210. The message 218 includes a message header 222 and a message content 224.

The message header 222 includes data that helps the message router 214 deliver the message 218 to its destinations, i.e., one or more destination participant 212b. Some examples of elements in the message header 222 are:

To—The destinations of the message.
From—The origin of the message.
Date—The date and time of message creation.
Message ID—A unique identification for the message.
Content length—The length of the content.
Content type—The MIME type of the content.
Priority—The priority of the message.

The message content 224 includes data that is produced by a source participant 212a and destined to one or more destination participants 212b. Of course, the collaboration participants 212 can and often do change roles as source participant 212a and destination participant 212b if multiple messages 218 are exchanged during the course of a collaboration. The message routers 214 do not inspect the message content 224. [Special services such as content filtering and virus scanning can examine the message content before forwarding it to its destinations. However, this is an optional service and is independent of message routing.]

FIG. 10 also shows how the depicted embodiment of the security server system 210 actually uses two types of keys for protecting data. Again with protection being with respect to confidentiality, integrity, or both. Firstly, the message router 214 establishes a header key 226 with each collaboration participant 212. The header key 226 protects the message header 222 of a message 218. Every connection between a message router 214 and a collaboration participant 212 uses a different header key 226. The key server 216 does not create, store, or manage the header keys 226. Moreover, the header keys 226 are ephemeral and do not last beyond the life of the session between the message router 214 and the collaboration participant 212. Secondly, a conversation key 220 protects the content of a message 218. It is possible for any process (collaboration participant 212 or message router 214) to create (request and be granted) a conversation key 220. Using this two key approach enables efficient, yet highly secure distribution of messages 218 from their source to their destinations.

This use of two keys is also different than the scheme depicted in FIG. 1, where only one key equivalent to the a conversation key 220 is used. The use of the header key 226 is optional, but adds additional security. An enterprise that controls the message router 214, for instance, may wish to impose this added level of security and keep even the information in the message header 222 secure.

The message router 214 only needs to process the message header 222 of a message 218 to perform its tasks. In FIG. 10, it uses the header keys 226 ($K_{H1}$, $K_{H2}$, $K_{H3}$, or $K_{H4}$), depending on the collaboration participant 212 with which it communicates. The message content 224 of the message 218 simply flows through the message router 214 unmodified, and the destination participants 212b then request and use the same conversation key 220 ($K_C$) to decrypt and to verify the integrity of the message content 224 of the message 218. Separating the header key 226 from the conversation key 220 in this manner is advantageous in that each message router 214 can "stream" messages 218 to the next, without needing to verify the integrity of the entire message content 224. This is in contrast to SSL and IPSec, that must artificially break messages into manageable blocks and encrypt each block individually.

In order to provide forward and backward secrecy, the message router 214 can change or "roll over" the conversation key 220 when any of the following events occur. When a new collaboration participant 212 joins a conversation, the message router 214 can see that the conversation key 220 is changed. All of the messages 218 communicated prior to this event remain encrypted using the old conversation key 220 and, by default, are not made available to the new collaboration participant 212. Similarly, when an existing collaboration participant 212 leaves the conversation (e.g., disconnects from the message router 214), all of the messages 218 communicated subsequent to this event are encrypted using a new conversation key 220. This new conversation key 220 is not, by default, available to the departing collaboration participant 212. Under the preferred embodiment of the security server system 210, transcripts remain encrypted while in storage. Therefore, depending on the sequence of events during a collaboration (i.e., join and leave operations), there may be multiple conversation keys 220 that encrypt different parts of a conversation.

The conversation key 220 roll over process can be optimized, say, when there may be large numbers of collaboration participants 212, in keeping with the enterprise collaboration theme of this embodiment in FIGS. 9 and 10. Even though the message router 214 generally should not be able to access the actual (encrypted) message content 224, it can determine when the message content 224 is substantive. For example, information in the message header 222 may indicate this or the message content 224 may be absent. With this information the message router 214 can defer rolling over the conversation key 220 until the next substantive message 218 is encountered. Thus, multiple collaboration participants 212 may join a new conversation and the conversation key 220 is not automatically rolled over as each joins. Instead, the conversation key 220 is rolled over when a substantive message 218 is sent. Similarly, multiple collaboration participants 212 may leave an existing conversation and the conversation key 220 is not rolled over until the next substantive message 218 is sent.

The following discussion summarizes, without limitation, some of the novel ideas the security server system 210 implements. It can assign and use a single conversation key 220 to protect data throughout its life. By use of this single conversation key 220, the message router 214 need not decrypt and re-encrypt the messages 218. This enables highly efficient routing of the messages 218 and permits scalable, enterprise-class collaboration systems.

In contrast, existing technologies use multiple keys for protecting data (with respect to confidentiality and integrity) as it is transmitted from its origin to multiple destinations. Typical implementations employ the secure socket layer/transport layer security (SSL/TLS) or IPSEC protocols. Using SSL/TLS every message must be encrypted at its origin, decrypted at the server that routes it (i.e., the hub), re-encrypted again at the hub, and finally decrypted at the final destination.

The security server system 210 can also easily maintain forward and backward secrecy. When a new collaboration participant 212 joins or when an existing collaboration participant 212 leaves a collaboration, the conversation key 220 can be changed. This assures all the collaboration participants 212 that new users do not have access to any part of the collaboration data prior to joining and, similarly, that users who have left the conversation do not have access to the collaboration data after leaving. Even if an attacker can remain connected to the security server system 210 and receive messages 218, the conversation key 220 to decrypt that message content 224 of those messages 218 will not be available to them.

In contrast, existing technologies rely on the state of the connection to maintain secrecy. That is, a user who is not connected to the hub cannot receive collaboration data. While this works for unsophisticated users, it is not a secure technique for protecting collaboration data from more sophisticated attackers.

The security server system 210 also permits efficient multi-user participation. It minimizes the number of encryptions and decryptions at the message router 214 by not performing encryptions or decryptions with the conversation key 220 at the message router 214. In fact, the number of encryptions and decryptions applied to the collaboration data at the message router 214 is independent of the number of collaboration participants 212.

In contrast, existing technologies degrade in performance when the number of users increases. There are many factors that contribute to such performance degradation, but a major one is the number of protection operations performed at each component of the system. Existing technologies use a session key for protecting the collaboration data. This is inefficient because the number of sessions is proportional to the number of users, and the number of required protection operations increases with the number of users.

The security server system 210 also permits multiple, secure threads in the same collaboration or session. This is because collaboration data (message content 224) is protected using the conversation key 220 rather than a session key. Thus, a session may use multiple conversation keys 220 depending on the set of authorized collaboration participants 212.

Existing technologies use a session key to protect the collaboration data. Protection of multiple threads of conversations within the same collaboration therefore requires multiple sessions. This in turn results in rigid and inefficient systems.

The security server system 210 also handles transcripts more elegantly. It uses the same set of conversation keys 220 for protecting the message content 224 during and after the collaboration. This results in more flexible, yet highly secure collaboration systems.

Technologies that use session keys have rigid techniques for protecting a transcript of the collaboration data, because session keys are ephemeral and do not last beyond the end of a collaboration.

The security server system 210 also improves on other existing security technologies as now described. A collaboration technology that uses public key infrastructure (PKI) for all of its security function results in inefficient and rigid systems. Protecting collaboration data using PKI requires all participants to have PKI digital certificates. In contrast, the security server system 210 can use PKI certificates to authenticate any collaboration participant 212. However, owning a PKI certificate is not required. Thus, collaboration participants 212 who can prove their authenticity at a sufficiently strong level can engage in the collaboration.

A collaboration technology that is based on IPSec must use individual Security Associations (SA). First, an SA is ephemeral and SA keys can practically only protect collaboration data while in transit. Second, an SA is specific to a source/destination pair. Therefore, collaboration applications (e.g., Instant Messaging) that work based on a huband-spoke model require protection of data as information travels through multiple SAs. In contrast, the security server system 210 can protect collaboration data (message content 224) while in transit and in storage using the same base technology.

A collaboration technology that uses SSL/TLS requires multiple SSL/TLS sessions. First, a session is ephemeral and session keys can practically only protect the collaboration data while in transit. Second, a session is specific to a client/server pair. Therefore, collaboration applications (e.g., Instant Messaging) that work based on a huband-spoke model will require protection of data as information travels through multiple sessions. In contrast, the security server system 210 can protect collaboration data while in transit and in storage (i.e., a transcript) using the same base technology.

Figure 11:
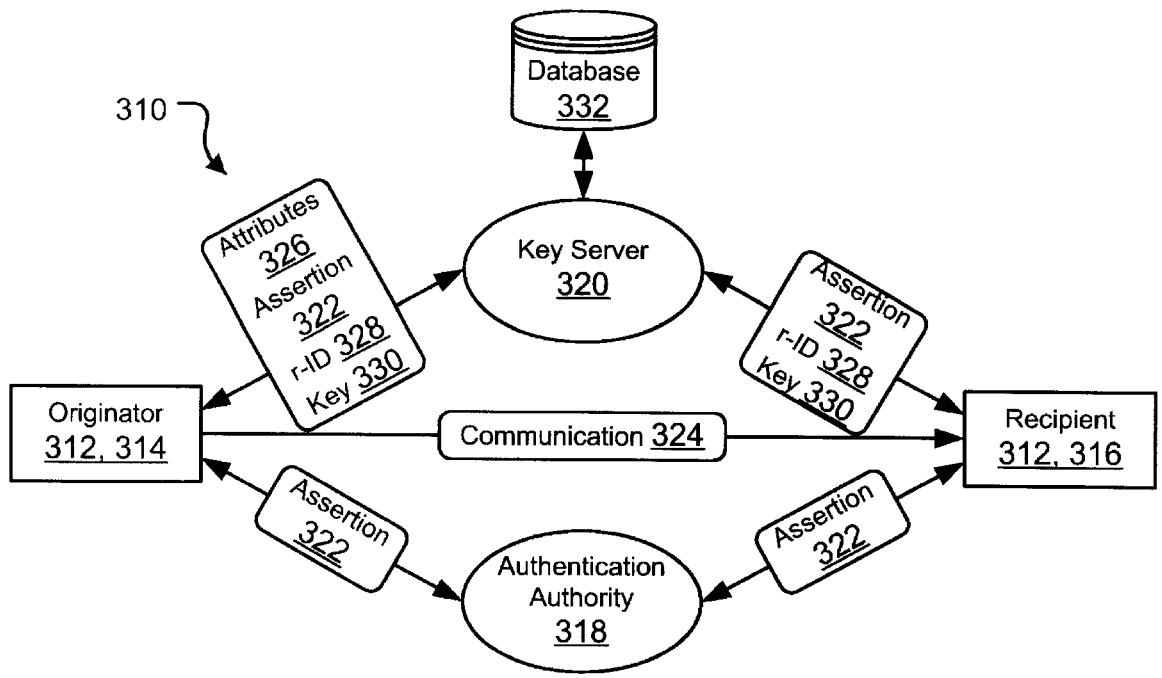
FIG. 11 is a block diagram depicting how a communication system in accord with the present invention consists of four basic components.

FIG. 11 is a block diagram depicting how the present inventive communication system 310 consists of four basic components: a communicating party 312 (an originator 314 or a recipient 316), an authentication authority 318, and a key server 320.

Typically, both the originator 314 and the recipient 316 will contact the authentication authority 318 and authenticate themselves. However, the authentication authority 318 for the originator 314 may or may not be the same as the authentication authority 318 for the recipient 316. The communicating party 312 uses a protocol that is specific to the authentication authority 318 (e.g., user ID and password over TLS, two factor authentication, challenge/response protocol using PKI certificates, etc.). As a result of successful authentication, the authentication authority 318 issues the communicating party 312 an authentication assertion 322. The authentication authority 318 signs this assertion 322 (typically, using a PKI private key). Every assertion 322 is different.

Subsequently, the originator 314 has data for a communication 324 that it wants to sent to one or more recipients 316. The originator 314 then contacts the key server 320 and provides it with its assertion 322 and with attributes 326 for the intended communication 324. The attributes 326 are described in more detail below, but include a list of the intended recipients 316 for the communication 324.

The key server 320 confirms the assertion 322 from the originator 314. Then it assigns a resource ID 328 to the prospective communication 324, creates a key 330 suitable to encrypt the communication 324, and provides the resource ID 328 and the key 330 back to the originator 314. Optionally, the originator 314 can instead send the key 330 to the key server 320 and ask it to associate that key 330 with a resource ID 328. In the course of all this, the key server 320 records the resource ID 328, the key 330, the assertion 322, and the attributes 326 in a database 332 that it maintains.

The originator 314 next constructs the communication, by encrypting the data using the key 330 and adding the resource ID 328 in the clear. The originator 314 then transmits the communication 324 to all of the recipients 316 using conventional means. Note, the originator 314 need not, and in most embodiments will not, ever send the communication 324 to either the key server 320 or the authentication authority 318.

Each recipient 316 must retrieve a key 330 from the key server 320 that is suitable for decrypting the encrypted communication 324. Since the communication 324 includes the resource ID 328 in the clear, the recipient 316 provides its assertion 322 and the resource ID 328 to the key server 320. The key server 320 then confirms the assertion 322 from the recipient 316. It also checks that the recipient 316 is an intended one for the communication 324 that the resource ID 328 specifies, using the list of intended recipients 316 that the originator 314 previously provided in the attributes 326. If the attributes 326 also included other criteria, described presently, for making a key 330 available, the key server 320 also checks that those criteria are met. Then the key server 320 provides the key 330 to the recipient 316.

Finally, the recipient 316 decrypts the communication 324 with the key 330. Coincidental with this, the integrity of the content of the communication 324 is validated by whether decryption is successful and, optionally, by comparing a cryptographic checksum that has been included in the communication 324. Such a checksum can be in the clear part of the communication 324, along with the resource ID 328, but more typically will be included in the encrypted part along with the content of the communication 324. Such a checksum can also encompass different parts of the overall communication 324. For instance, it may be derived from only the content part of the communication 324, or it may be derived from other parts of the communication 324. An example when the communication 324 is in e-mail form might be to include the subject and the encryption time in the checksum. In this manner, the recipient 316 can tell if a subject portion sent in the clear has been altered or if the communication 324 has been unduly delayed.

TABLE 1 shows the inventors' presently preferred schema for the content of the database 332 maintained by the key server 320. The ResourceID field is straightforward, it is the resource ID 328 we have already discussed. The ResourceType field provides the scope of the application type for which the key 330 is created. For example, E-mail and Instant Messaging could use different resource types. This will relieve different applications from needing to coordinate resource ID 328 uniqueness. The combination of the ResourceID and ResourceType fields is always unique. The ResourceKey is simply the key 330, also already discussed. Only one ResourceKey is needed if the key 330 is a symmetric key, i.e., the same key 330 is used by both the originator 314 and the recipient 316. Embodiments of the communication system 310 may also use asymmetric keys. In this case, if the key server 320 provides the encryption key 330 to the originator 314, it will have a ResourceEncryptKey field for that as well as a ResourceDecryptKey field to store the decryption key 330 that should be provided to the recipient 316. If the originator 314 handles key generation, it may send both the encryption and decryption keys 330 to the key server 320, or just the decryption key 330.

Continuing with the schema, the KeySize field is optional. One size key may be used exclusively, but there is no limitation that this be the case. Some users may want the very strong encryption that a bigger key can provide, while others may want the reduced processing burden that a smaller key can provide. Another consideration is that keys have tended to become bigger as cracking resources have become more powerful. This trend will likely continue, and embodiments of the invention may thus need to handle different key sizes just to deal with legacy key size and upgrade key size issues.

The KeyCreator field may also be optional. Embodiments of the invention are possible where only the key server 320 creates the keys 330, or where the originators 314 always create the keys 330. Having this field permits either of these, or a mixed arrangement where the keys 330 are sometimes created by the key server 320 and other times created by the originators 314. Having such capability present in an embodiment, of course, does not limit policies being used to specify which arrangement is used or to specify arrangements that must be used for particular originators 314.

It is anticipated that the KeyOwner field will be present in the vast majority of embodiments. The originators 314 are the "owners" of the keys 330 and one use of this field is to facilitate the key server 320 changing the contents of the schema in useful ways. For example, in a corporate context an originator 314 may want to prevent a key 330 from being released to a recipient 316 who has just now been discharged. Alternately, an originator 314 may want to now permit release of the key 330 for a longer period of time than that initially specified, say, because the originator 314 has discovered that the recipient 316 is on vacation. The KeyOwner field also permits the key server 320 to respond to requests from other parties, but presumably only when appropriate. For instance, a government agency may request the key server 320 to freeze all keys 330 already issued to a particular originator 314 and to not issue additional ones. Or a court may order the release of a key 330 to decrypt a communication 324 to check for evidence of a conspiracy between an originator 314 and a recipient 316.

Intentionally not having or having and simply not using the KeyOwner field is still possible. A key server 320 might provide keys 330 to "anonymous" originators 314, and even to "anonymous" recipients 316. In a simplest form of this, a key server 320 could provide a key 330 and a resource ID 328 when any originator 314 simply asks; and the key server 320 can then provide that key 330 (or a corresponding one if asymmetric encryption is used) to any recipient 316 who simply asks and provides the resource ID 328. Alternately, an anonymous originator 314 could specify an intended recipient 316, so that the key server 320 would only release the key 330 to that non-anonymous recipient 316. A key server 320 also might or might not require an assertion 322 from either or both of the originator 314 and the recipient 316. For instance, the key server 320 might provide or release a key 330 to a communicating party 312 merely on the strength of having been provided a valid assertion 322.

Continuing again with the schema, the DateCreated field is theoretically optional, but has clear uses and typically will be provided and used. The rest of the fields in the schema are ones set in response to the attributes provided by the originator 314, and should be clear from the description in TABLE 1 and the following discussion of how these relate to events.

The inventive communication system 310 enables the construction of three sets of business events. Controlling events 340 (FIG. 12) consist of a set of actions taken by an originator 314 to control when and how many times a recipient 316 can view a communication 324. Positive events 342 (FIG. 13) consist of a set of actions taken by a recipient 316. And negative events 344 (FIG. 14) consist of a set of actions that were expected from a recipient 316 but have not yet been initiated.

The key server 320 sets the controlling events 340 based on the attributes 326 provided by originators 314. The key server 320 can then determine both the positive events 342 and the negative events 344 based on the information in its database 332 and its communications or lack thereof with the recipients 316.

Recall that in order for the recipients 316 to view the communication 324 they authenticate and retrieve the decryption key 330 from the key server 320. The originator 314 of the communication 324 is the "owner" of this key 330 and can set the attributes 326 to create the controlling events 340 for when, and how many times each recipient 316 can retrieve the decryption key 330. The attributes that enable this functionality are the fields ReleaseAfter, ExpireOn, and NumReleases in the database 332 that the key server 320 maintains.

Figure 12:
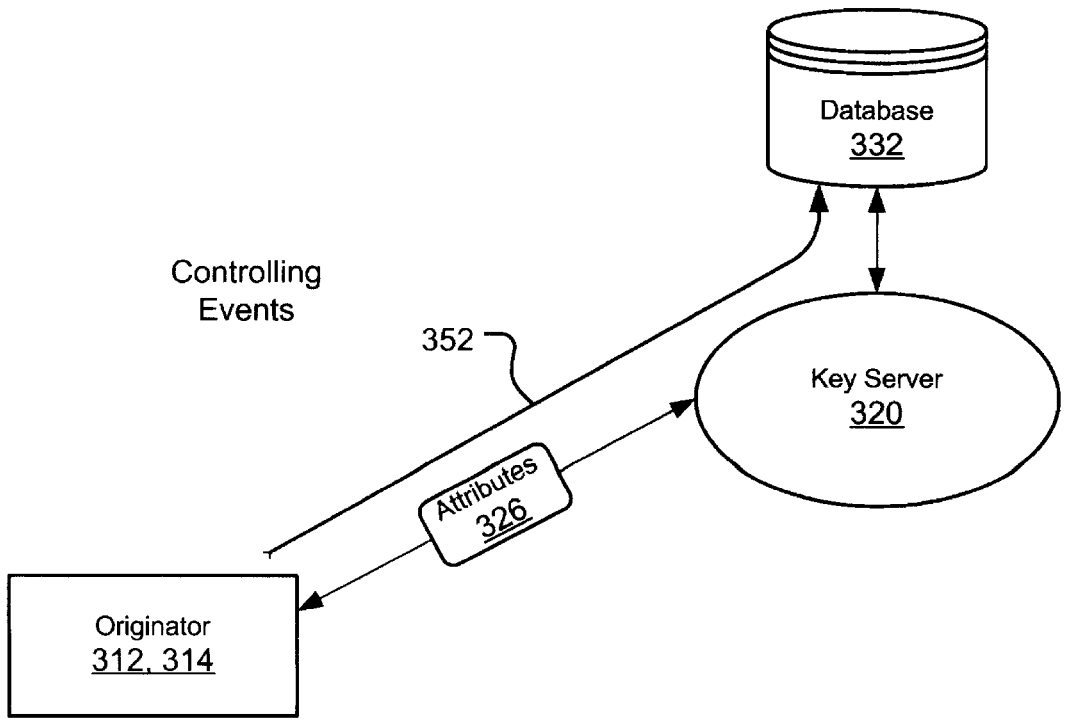
FIG. 12 is a block diagram showing the flow of information related to controlling events of the present invention.

FIG. 12 is a block diagram showing the flow of information related to the controlling events 340. An arrowed line 352 shows how the attributes 326 flow from the originator 314 to the key server 320 and into its database 332.

Figure 13:
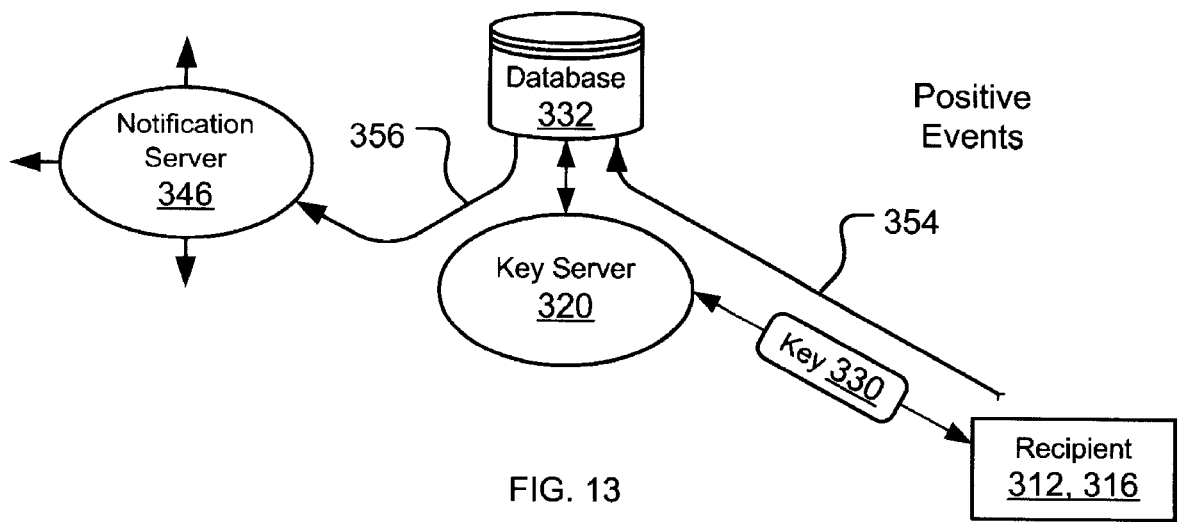
FIG. 13 is a block diagram showing the flow of information related to positive events of the present invention.

FIG. 13 is a block diagram showing the flow of information related to the positive events 342. An arrowed line 354 shows how a request for the key 330 (including the ResourceID and the recipient's assertion 322) flows from the recipient 316 to the key server 320 and information about this flows into the database 332 of the key server 320. The key server 320 records when, and how many times a given recipient 316 retrieves the key 330. This serves as the underpinning for creating the positive events 342 that signal the actions taken by a specific recipient 316 at a specific time. The attributes that enable this functionality are the fields LastReleased and NumReleased in the database 332 of the key server 320.

Another arrowed line 356 shows how the key server 320 can signal a notification server 346 (shown separate from the key server 320, but not necessarily so) when a recipient 316 retrieves the decryption key 330. The notification server 346 can then signal a follow up action, depicted by multiple arrowed line 358 going to multiple possible destinations. For example, the notification server 346 can notify a system in a marketing department, which in turn alerts a marketing representative to call the prospect (recipient 316) and follow up.

Figure 14:
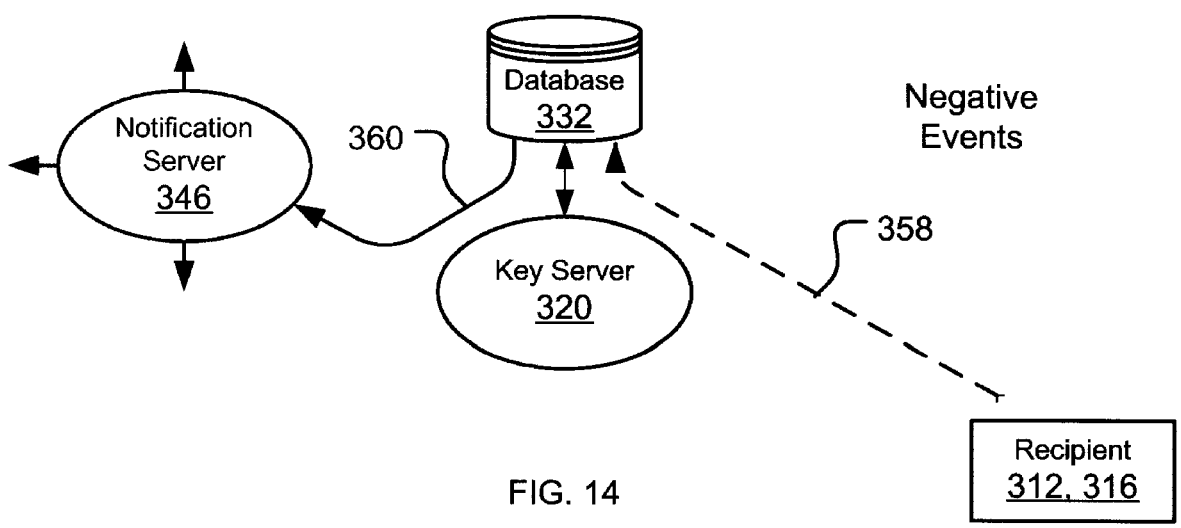
FIG. 14 is a block diagram showing the flow of information related to negative events of the present invention.

FIG. 14 is a block diagram showing the flow of information related to the negative events 344. Signaling the negative events 344 uses the attributes in the fields LastReleased and ExpectedRequest in the database 332 of the key server 320. A phantom arrowed line 360 (dashed) here shows the flow of information from the recipient 316 to the key server 320 that has not occurred, and the arrowed line 356 and the multiple arrowed line 358 again show the flow of information from the key server 320 to the notification server 346 that occurs due to this. If a recipient 316 fails to request the key 330 by a given time, then the key server 320 sends a signal to the notification server 346, and the notification server 346 can then signal a follow up action. For example, the notification server 346 can notify a system in a customer call center, which in turn alerts a customer service representative to call the customer (recipient 316) and verbally communicate the content of the communication 324.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present invention, which has been illustrated herein with the communication system 310 as an example, is well suited for application in current network environments, such as the Internet, to implement business processes using key server events. As has been described above, the invention uses controlling events 340 set by an originator 314 of a communication 324, or by another party setting these on behalf of the actual originator 314. The communication 324 is then sent encrypted to one or more recipients 316. As the recipients 316 seek to view the communication 324, subject to the controlling events 340, positive events 342 are noted. Alternately, if one or more of the recipients 316 fails to view the communication 324, due to a failure to even try or due to a failure to conform with the controlling events 340 allowing then to view, negative events 344 are noted.

The ability to review the positive events 342 and the negative events 344, or to trigger actions based on them, has considerable utility. For example, originators 314 representing businesses and other entities desiring to communicate with recipients 316 can now specify with controlling events 340 when the communication 324 can first be viewed, how often it can be viewed, and when it can no longer be viewed. Based on the positive events 342, originators 314 and other appropriate parties can determine if, when, and how many times each recipient 316 has viewed the communication 324. Alternately, based on the negative events 342, originators 314 and other appropriate parties can determine the absence of any attempt by a given recipient 316 to view the communication 324, or any failed attempts by recipients 316 to view the communication 324.

Revisiting the example in the Background Art section of a financial brokerage company needing to determine whether a customer has received notice of a margin call, we can now see how easily the present invention can serve where prior art systems fail. By virtue of a customer (recipient 316) creating a positive event 342 automatically when they view the notice (the communication 324, say, an e-mail), the customer is not burdened with having to affirmatively acknowledging receipt. Also, the brokerage company (originator 314) can immediately be appraised that the notice has been viewed, and not be burdened by taking unnecessary additional action. Alternately, be virtue of a customer creating a negative event 342 automatically when they fail to view the notice within a set period (a controlling event 340), the brokerage company can take appropriate action.

For the above, and other, reasons, it is expected that the present invention will have widespread industrial applicability and it is expected that the commercial utility of the present invention will be extensive and long lasting.

TABLE 1

| No Field | Type | Description |
| --- | --- | --- |
| 1. ResourceID | String | A unique ID assigned to this communication |
| 2. ResourceType | Integer | The application type (e.g., email, instant messaging, etc.) |
| 3. ResourceKey | Binary | The encryption key |
| 4. KeySize | Integer | The size of the key |
| 5. KeyCreator | String | The ID of the key creator |
| 6. KeyOwner | String | The ID of the key owner |
| 7. DateCreated | Date | The date and time when the key was created |
| 8. ReleaseAfter | Date | The date and time before which the key should not be released (per recipient) |
| 9. ExpireOn | Date | The date and time after which the key should not be released (per recipient) |
| 10. LastRelease | Date | The last date time the key was released (per recipient) |
| 11. ExpectedRequest | Date | The date and time by which the key is expected to be requested (per recipient) |
| 12. NumReleased | Integer | The number of times the key was released (per recipient) |
| 13. NumReleases | Integer | The number of times the key should be released (per recipient) |

The invention claimed is:

1. A system for determining communications events, comprising:

a key server to release keys to communicating parties, wherein said keys are encryption keys to encrypt or decryption keys to decrypt the communications and said communicating parties include originators seeking to create and recipients seeking to view the communications; and for each of the communications, said key server also to:
assign an identifier;
store a record in a database that includes said identifier, a respective said decryption key, and respective controlling events;
receive zero, one, or more requests for said decryption key, wherein said requests include said identifier; and
determine at least one member of the set consisting of positive events and negative events based on said controlling events and how many said requests are received or when any said requests are received.

2. The system of claim 1, wherein said encryption key and said decryption key are the same.

3. The system of claim 1, wherein said encryption key and said decryption key are different.

4. The system of claim 1, wherein said key server is able to generate said keys.

5. The system of claim 1, wherein said key server is able to receive said keys from an outside source.

6. The system of claim 5, wherein said outside source is a said originator.

7. The system of claim 1, wherein said key server requires an assertion before releasing said keys.

8. The system of claim 1, wherein at least some of said controlling events are defined based on attributes provided by said originator.

9. The system of claim 1, wherein at least some of said controlling events are pre-stored in said database in anticipation of use in later said communications.

10. The system of claim 9, wherein at least some of said controlling events are determined based on attributes received from a party other than a said originator.

11. The system of claim 1, wherein a said controlling event specifies a time after which a said decryption key is made releasable, thereby specifying a delay before a said recipient can decrypt a said communication.

12. The system of claim 1, wherein a said controlling event specifies a time after which a said decryption key is made un-releasable, thereby specifying an expiration after which a said recipient can no longer decrypt a said communication.

13. The system of claim 1, wherein a said controlling event specifies how many times a said decryption key should be released to a said recipient, thereby limiting the times said recipient can decrypt a said communication.

14. The system of claim 1, wherein:
said key server requires an assertion for a said recipient; and
said controlling events specify at least one condition that must be met before releasing a said decryption key to said recipient.

15. The system of claim 1, wherein said key server communicates data about at least one of said positive events or said negative events to at least one of said originator and another entity.

16. The system of claim 15, wherein said another entity is a notification server.

17. A method for determining communication events, the method comprising:
(a) receiving a first request for a resource ID to identify the communication, wherein said first request includes at least one identity of an intended recipient of the communication;

(b) defining at least one controlling event, wherein said controlling events include said at least one identity;

(c) providing said resource ID in reply to said first request;

(d) storing said resource ID, said controlling events, and a decryption key to decrypt the communication;

(e) monitoring for a second request for said decryption key, wherein said second request includes said resource ID and identifying information for a putative said intended recipient;

(f) if a said second request is received, then determining whether it conforms with said controlling events, and
 (1) if so:
  (i) providing said decryption key in reply to said second request; and
  (ii) storing said identifying information and a positive event in association with said resource ID;
 (2) else, storing a negative event in association with said resource ID; and (g) alternately, if no said second request is received for a said intended recipient, then storing a negative event in association with said resource ID.

18. The method of claim 17, wherein said step (c) includes providing an encryption key.

19. The method of claim 18, wherein said encryption key and said decryption key are the same.

20. The method of claim 18, wherein said encryption key and said decryption key are different.

21. The method of claim 17, wherein said first request includes an authentication assertion and said step (a) includes verifying said authentication assertion before providing said resource ID in said step (c).

22. The method of claim 17, wherein at least some of said controlling events are defined based on attributes provided by an originator of the communication.

23. The method of claim 17, wherein at least some of said controlling events are pre-stored before said step (a) in anticipation of later use in the communication.

24. The method of claim 23, wherein at least some of said controlling events are determined based on attributes received from a party other than said originator.

25. The method of claim 17, wherein a said controlling event specifies a time after which said decryption key is made releasable to a said recipient.

26. The method of claim 17, wherein a said controlling event specifies a time after which said decryption key is made un-releasable to a said recipient.

27. The method of claim 17, wherein a said controlling event specifies how many times said decryption key should be released to a said recipient.

28. The method of claim 17, wherein said second request includes an authentication assertion including said identifying information and step (f) includes verifying said authentication assertion before providing said decryption key.

29. The method of claim 17, further comprising a step (h) communicating data about at least one of said positive events or said negative events to at least one of an originator of the communication and another entity.

30. The method of claim 29, wherein said another entity is a notification server.

* * * * *